US008739497B2

(12) United States Patent
Meuser

(10) Patent No.: US 8,739,497 B2
(45) Date of Patent: Jun. 3, 2014

(54) ROOFING APPARATUS

(76) Inventor: Paul Duggan Meuser, San Francisco, CA (US)

( * ) Notice: Subject to any disclaimer, the term of this patent is extended or adjusted under 35 U.S.C. 154(b) by 24 days.

(21) Appl. No.: 13/602,132

(22) Filed: Sep. 1, 2012

(65) Prior Publication Data
US 2013/0055673 A1 Mar. 7, 2013

Related U.S. Application Data

(60) Provisional application No. 61/530,583, filed on Sep. 2, 2011.

(51) Int. Cl.
*E04B 1/70* (2006.01)
*E04F 17/00* (2006.01)

(52) U.S. Cl.
USPC ............ 52/745.06; 52/302.1; 52/302.3

(58) Field of Classification Search
CPC .... A01G 1/007; A01G 1/005; E07D 13/0404; E07D 13/0445; E07D 13/04; E07D 11/002; E07D 13/00
USPC ............ 52/745.06, 302.1, 302.3; 47/65.9
See application file for complete search history.

(56) References Cited

U.S. PATENT DOCUMENTS

| 5,595,021 | A   | * | 1/1997  | Ripley et al. ........... 47/66.5 |
|-----------|-----|---|---------|---------------------------------|
| 6,606,823 | B1  | * | 8/2003  | McDonough et al. ...... 47/65.9 |
| 6,862,842 | B2  |   | 3/2005  | Mischo                          |
| 7,603,808 | B2  |   | 10/2009 | Carpenter et al.                |
| 8,272,163 | B2  | * | 9/2012  | Dubner ..................... 47/65.9 |
| 8,479,443 | B2  | * | 7/2013  | Buist ........................ 47/65.9 |
| 2008/0168710 | A1 | * | 7/2008 | MacKenzie .............. 47/65.9 |
| 2009/0260284 | A1 |   | 10/2009 | Barbalho                       |
| 2009/0320364 | A1 | * | 12/2009 | Mackenzie ............... 47/65.9 |
| 2010/0095586 | A1 | * | 4/2010  | Sichello ................... 47/65.9 |
| 2010/0126066 | A1 |   | 5/2010  | DeVos                          |
| 2011/0030274 | A1 | * | 2/2011  | Buist ...................... 47/65.6 |
| 2011/0067325 | A1 | * | 3/2011  | Modica et al. ........... 52/173.1 |
| 2011/0197523 | A1 | * | 8/2011  | Dubner .................. 52/173.1 |
| 2011/0289839 | A1 | * | 12/2011 | Cronk et al. ............. 47/65.7 |

FOREIGN PATENT DOCUMENTS

SG WO2007050042 A1 5/2007

* cited by examiner

*Primary Examiner* — Mark Wendell
(74) *Attorney, Agent, or Firm* — Ash Tankha; Lipton, Weinberger & Husick

(57) ABSTRACT

A roofing apparatus including an enclosure for containing roofing materials is provided. The enclosure is defined by a front panel, a rear panel assembly positioned at a predetermined distance from the front panel, side panels positioned at opposing ends of the front panel, and a base panel having a tail area. The front panel, the rear panel assembly, and the side panels extend upwardly from the base panel. The tail area extends beyond the rear panel assembly for receiving runoff. The rear panel assembly directs the runoff from the tail area of the base panel into the enclosure. The front panel includes orifices for releasing the runoff to a downslope roofing apparatus or for draining the runoff from the roof. The roofing apparatus precludes slippage of the roofing materials contained within the enclosure, and uplift of the roofing materials from the enclosure due to environmental conditions.

29 Claims, 27 Drawing Sheets

US 8,739,497 B2

ROOFING APPARATUS

CROSS REFERENCE TO RELATED APPLICATIONS

This application claims the benefit of provisional patent application No. 61/530,583 titled "Roofing Apparatus", filed in the United States Patent and Trademark Office on Sep. 2, 2011.

The specification of the above referenced patent application is incorporated herein by reference in its entirety.

BACKGROUND

A green roof is a roof of a building that is partially or completely covered with vegetation and growth media planted over a waterproofing membrane. Examples of the growth media are soil, fertilizer, etc. There are two types of green roofs, namely, intensive roofs and extensive roofs. Intensive roofs are thicker and can support a wide variety of plants but are heavier and require more maintenance than extensive roofs. Extensive roofs are typically covered with a light layer of vegetation and are hence lighter than intensive roofs.

Green roofs reduce storm water runoff, absorb about 70% to about 100% of rainfall on the roof, reduce heat loss in winter, reduce internal building temperature during summer, reduce energy costs, improve sound insulation for the building, improve the aesthetics of the building, and are beneficial for wildlife. Moreover, the vegetation on the green roof removes carbon dioxide and absorbs pollutants from the atmosphere, protects the green roof from ultraviolet (UV) light, thereby increasing the life span of the green roof, and increases the potential to score, for example, more than 7 leadership in energy and environmental design (LEED) credits under the Unites States (US) green building council certification system. Furthermore, evaporation from the vegetation cools the air around the green roof. Hence, there is a need for increased use of green roofs on buildings.

However, conventional green roofs incur high material and installation costs, for example, about 500% to about 1000% higher costs than traditional roofing costs. Moreover, conventional green roofs require stronger roof beams for supporting the extra weight of the vegetation and the growth media, incur high maintenance costs, and require complex drainage systems, thereby limiting their use primarily to expensive custom homes, large public buildings, and corporate headquarters. Furthermore, most homes typically have sloped roofs for which inexpensive and easy to install green roofs are not available. Furthermore, traditional roofing is utilitarian only and there is a need for green roofs that are also aesthetically pleasing.

Furthermore, there is a need for managing precipitation and runoff through the capture and use of frequent lower intensity rainfall, for example, for supplementing irrigation of the vegetation in the green roofs, for physical and biological filtering treatment of the precipitation for water quality treatment; and also for the delay, evaporation, and transpiration of this precipitation for hydromodification management. Hydromodification is the change to storm water runoff volume, magnitude, and duration caused by changes in land use. For example, changing land use from natural to residential can increase the speed and amount of rainfall runoff. Hydromodification can result in adverse effects to stream habitat, surface water quality, and water supply, while the associated stream erosion can threaten infrastructure, homes, and businesses. Many municipalities in the United States now require certain development or redevelopment projects to incorporate water quality treatment measures and hydromodification management measures to minimize stream impacts such as excess erosion and sedimentation. Therefore, there is a need for developing a hydromodification management function in a roof, which delays the more frequent, lower intensity rainfall, and allows volume reducing effects such as evaporation to occur.

Hence, there is a long felt but unresolved need for a roofing apparatus that can be used in a roofing system, which is inexpensive, easy to install, support, and maintain on sloped roofs, and that requires uncomplicated drainage systems, manages hydromodification, and can be configured in multiple aesthetically pleasing architectural styles.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The apparatus and method of use disclosed herein address the above mentioned need for a roofing apparatus that can be used in a roofing system. The roofing apparatus disclosed herein is inexpensive, easy to install, support, and maintain on a sloped roof, and requires uncomplicated drainage systems. The roofing apparatus disclosed herein manages hydromodification and can be configured in multiple aesthetically pleasing architectural styles.

The roofing apparatus disclosed herein comprises an enclosure configured to contain roofing materials. As used herein, the term "roofing materials" refer to plantings and growth media on the roof. The growth media comprises, for example, soil, fertilizers, etc. The enclosure is defined by a front panel, a rear panel assembly, side panels, and a base panel having a tail area. The front panel, the rear panel assembly, and the side panels extend upwardly from the base panel. The front panel is positioned along a length of the base panel. The side panels are positioned at opposing ends of the front panel. In an embodiment, each of the side panels extends taperedly to the tail area of the base panel. In an embodiment, each of the side panels comprises a first side section and a second side section. The first side section of each of the side panels defines a nested area along with the front panel and the base panel. The second side section is outwardly offset from the first side section. The second side section in conjunction with the tail area of the base panel defines a nesting area. The nesting area of a downslope roofing apparatus is configured to support the nested area of an upslope roofing apparatus. As used herein, the term "downslope roofing apparatus" refers to a roofing apparatus connected downslope from another roofing apparatus, towards a bottom edge of a sloped roof. Also, as used herein, the term "upslope roofing apparatus" refers to a roofing apparatus connected upslope from another roofing apparatus, towards a top edge of a sloped roof. The first side section of each of the side panels is proximal to the front panel. The second side section of each of the side panels is proximal to the rear panel assembly. In an embodiment, the roofing apparatus disclosed herein further comprises a side notch and a side key. The side notch extends along a length of one of the side panels. The side key extends outwardly along a length of the other side panel. The side notch of the roofing apparatus is configured to engage with the side key of an adjacent roofing apparatus. In an embodiment, the roofing apparatus disclosed herein further comprises a key notch extending outwardly along the length of one of the side panels. The key notch is configured to facilitate flow of runoff along an interface defined between adjacent roofing apparatuses. The term "runoff" refers to water unused, not absorbed, not transpired, etc., by the roofing materials contained in the enclosure of the roofing apparatus. The runoff provides moisture to the roofing materials contained in the enclosure of the roofing apparatus. The runoff comprises, for example, rainfall runoff, runoff from an irrigation system provided on the roof, etc.

The tail area of the base panel extends horizontally beyond the rear panel assembly. The tail area of the base panel of a downslope roofing apparatus is configured to receive the runoff from an upslope roofing apparatus on a roof. In an embodiment, the roofing apparatus disclosed herein further comprises a pooling area defined in the tail area proximal to the rear panel assembly. The pooling area is configured to temporarily hold the received runoff from flowing into the enclosure. The rear panel assembly is positioned parallel and opposite to the front panel at a predetermined distance from the front panel. The rear panel assembly is configured to direct the received runoff from the tail area of the base panel into the enclosure of the roofing apparatus. In an embodiment, the rear panel assembly comprises multiple rear segments separated by a predetermined distance from each other. The rear segments define slots therebetween configured to direct the received runoff from the tail area of the base panel into the enclosure of the roofing apparatus through the slots. In another embodiment, the rear panel assembly comprises a slope member inclined from a top edge of the rear panel assembly towards the tail area of the base panel. The slope member is configured to control flow of the received runoff from the tail area of the base panel into the enclosure of the roofing apparatus.

In an embodiment, the roofing apparatus disclosed herein further comprises multiple orifices positioned on the front panel. The orifices are configured to release the received runoff from an upslope roofing apparatus to a downslope roofing apparatus, and/or to drain the received runoff from the roof. The orifices positioned on the front panel comprise, for example, low flow orifices and high flow orifices. The low flow orifices are positioned proximal to a bottom edge of the front panel. The high flow orifices are positioned above the low flow orifices and proximal to a top edge of the front panel. The high flow orifices are configured to release the received runoff from an upslope roofing apparatus to a downslope roofing apparatus, and/or to drain the received runoff from the roof. In an embodiment, the roofing apparatus disclosed herein further comprises a weir positioned on the front panel. The weir extends horizontally along a length of the front panel. The weir is configured to release the runoff received from less frequent, high intensity rainfall, from the enclosure of an upslope roofing apparatus to the tail area of a downslope roofing apparatus. The top edge of the front panel is defined at a predetermined distance below a top edge of each of the side panels. The top edge of the front panel is configured to drain excess runoff from the enclosure.

In an embodiment, the roofing apparatus disclosed herein further comprises multiple anchor ridges positioned at a predetermined distance from each other and parallel to the front panel within the enclosure. The anchor ridges are configured to preclude slippage of the roofing materials contained within the enclosure and to preclude uplift of the roofing materials from the enclosure due to environmental conditions, for example, wind. In an embodiment, the anchor ridges are configured to form one or more dams to trap runoff, for example, rain water or irrigation water for use by the roofing materials contained within the enclosure. In another embodiment, the roofing apparatus disclosed herein further comprises one or more elongate fasteners such as wire fasteners connected from the front panel to the rear panel assembly and from one of the side panels to the other side panel within the enclosure. The elongate fasteners are configured to preclude uplift of the roofing materials from the enclosure due to environmental conditions.

In an embodiment, the roofing apparatus disclosed herein further comprises a nesting groove and a nested ridge. The nesting groove is positioned on an inner surface of each of the side panels and extends rearward from the rear panel assembly. The nested ridge is positioned on the outer surface of each of the side panels. The nested ridge on the outer surface of each of the side panels of an upslope roofing apparatus is configured to slide into and engage with the nesting groove on the inner surface of each of the side panels of a downslope roofing apparatus. The engagement of the upslope roofing apparatus with the downslope roofing apparatus using the nested ridge-nesting groove combination, precludes uplift of the engaged roofing apparatuses, for example, due to environmental conditions. In an embodiment, the base panel is configured as an assembly comprising a first base section having the tail area, and a second base section inclined from the first base section. In this embodiment, the front panel, the rear panel assembly, and the side panels extend upwardly from the second base section to define the enclosure. In an embodiment, the roofing apparatus disclosed herein further comprises a batten anchor positioned on an underside surface of the base panel. The batten anchor is configured to interface the roofing apparatus with a roofing batten on the roof. In an embodiment, pre-drilled nail holes are positioned, for example, in the tail area of the base panel. The pre-drilled nail holes are configured to allow a fastener to attach the roofing apparatus to the roofing batten on the roof.

Disclosed herein is also a method for roofing and managing precipitation and runoff on a roof. In the method disclosed herein, multiple roofing apparatuses are provided. Each of the roofing apparatuses comprises the enclosure defined by the front panel, the rear panel assembly, the side panels, and the base panel having the tail area. The enclosure is configured to contain roofing materials. A set of roofing apparatuses is positioned in a predefined configuration with respect to another set of roofing apparatuses on the roof. The predefined configuration for positioning the roofing apparatuses on the roof is, for example, an upslope configuration, a downslope configuration, an adjacent configuration, a row configuration, a column configuration, any geometrical configuration, etc. Downslope roofing apparatuses receive runoff from upslope roofing apparatuses in their respective tail areas. The rear panel assembly of each of the downslope roofing apparatuses directs the received runoff from their respective tail areas into their respective enclosures. The received runoff is then drained from the enclosures, for example, through the orifices, the weirs, etc., positioned on the front panel of each of the downslope roofing apparatuses.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

DETAILED DESCRIPTION OF THE INVENTION

Figure 1A:
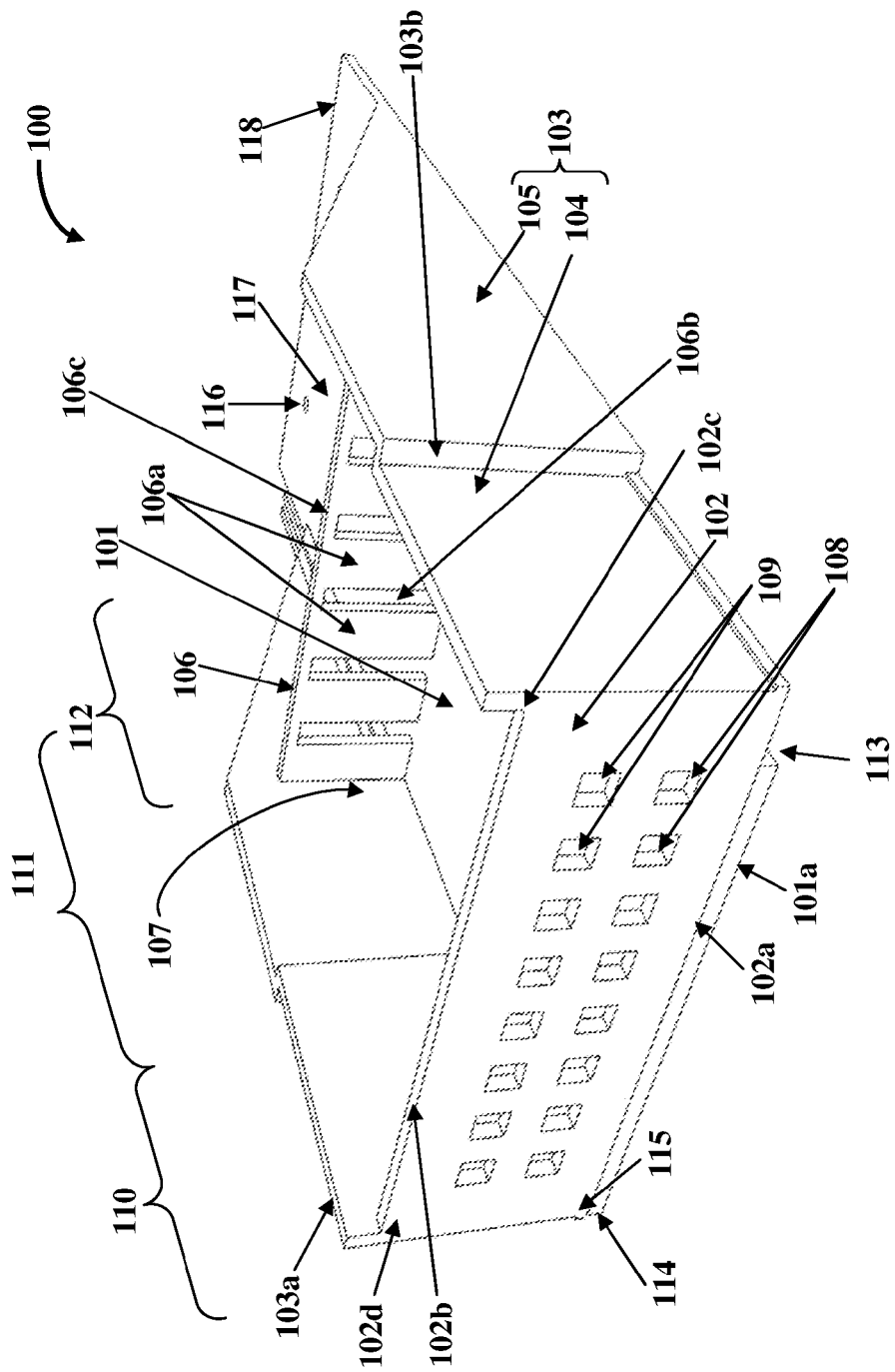
FIG. 1A exemplarily illustrates an isometric view of a roofing apparatus.
Figure 1B:
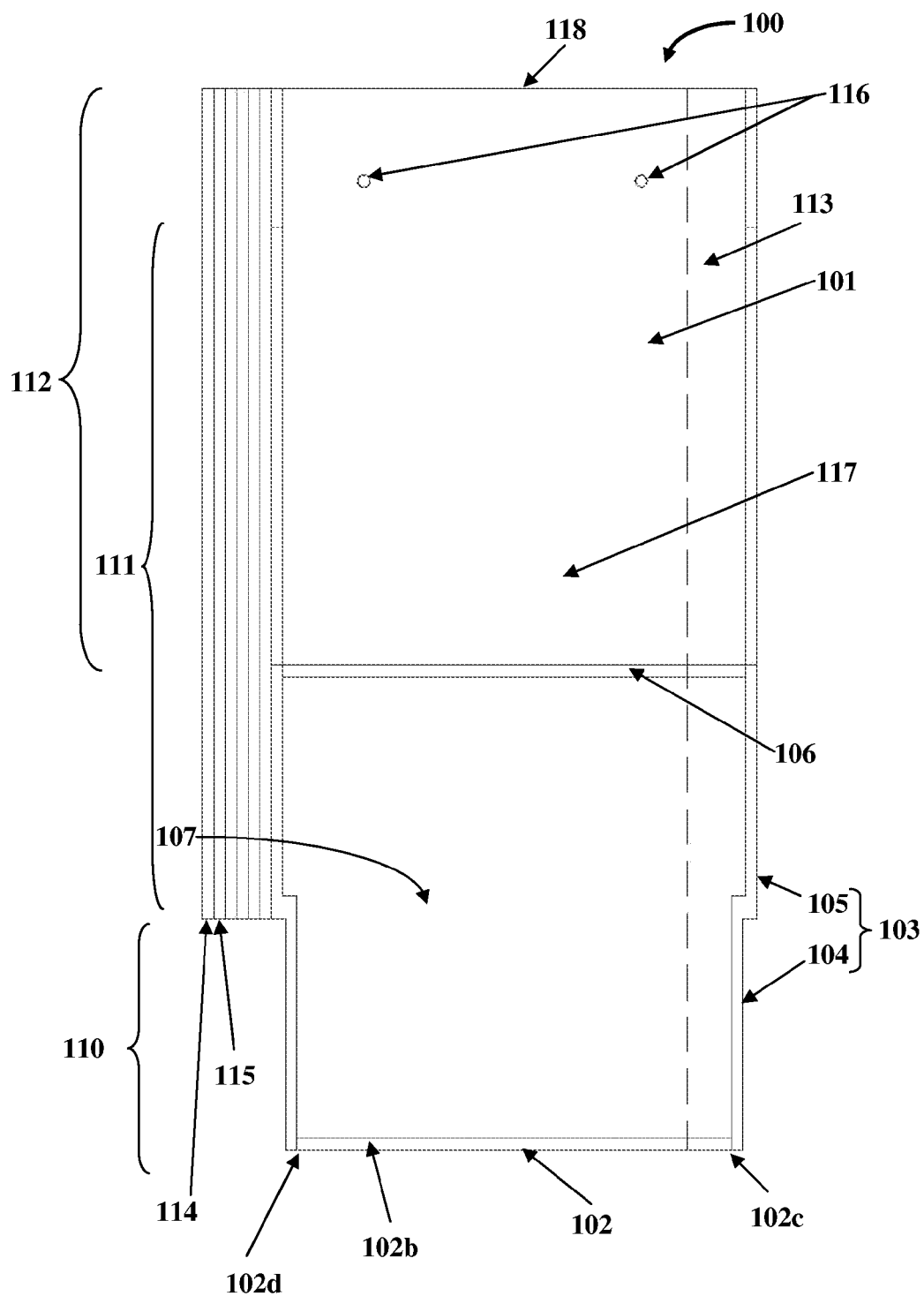
FIG. 1B exemplarily illustrates a plan view of the roofing apparatus.
Figure 1C:
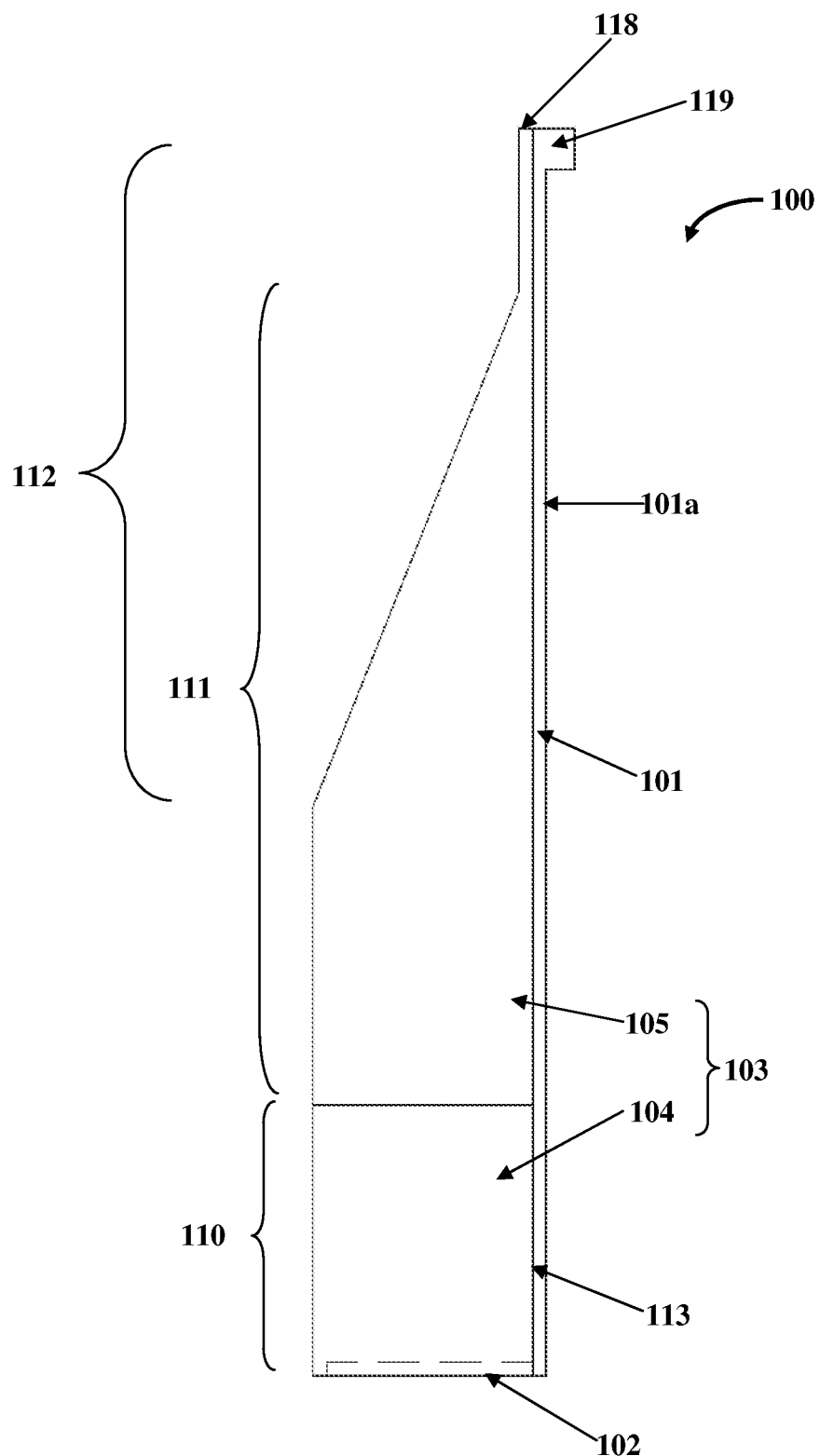
FIG. 1C exemplarily illustrates a side elevation view of the roofing apparatus.

FIGS. 1A-1C exemplarily illustrate an isometric view, a plan view, and a side elevation view, respectively of a roofing apparatus 100. The roofing apparatus 100 disclosed herein comprises an enclosure 107 configured to contain roofing materials 401 and 402 as exemplarily illustrated in FIGS. 4A-4B, FIGS. 5-6, FIGS. 8A-8B, FIG. 14B, and FIG. 15B. As used herein, the term "roofing materials" refer to plantings 401 and growth media 402 on a roof 301, for example, a sloped roof as exemplarily illustrated in FIG. 3C, FIG. 4A, FIGS. 5-6, FIG. 10, FIG. 14B, and FIG. 15B. The growth media 402 comprises, for example, soil, fertilizers, etc. The soil is, for example, engineered soil that is lightweight, has good water storage characteristics, low organic content, and suitable chemical properties, and has a good particle size distribution. An example of particle size distribution is as follows: 20% less than 1 millimeter, 40% 1 millimeter to 2 millimeters, 30% 2 millimeters to 10 millimeters, and 10% organic material such as compost, peat moss or worm castings. The enclosure 107 is configured to contain, for example, about 2 inches to about 8 inches of lightweight growth media 402 planted with plantings 401 such as sedums as disclosed in the detailed description of FIGS. 7A-7B.

The enclosure 107 of the roofing apparatus 100 disclosed herein is defined by a front panel 102, a rear panel assembly 106, side panels 103, and a base panel 101 having a tail area 112. The front panel 102, the rear panel assembly 106, and the side panels 103 extend upwardly from the base panel 101. The front panel 102 is positioned along a length of the base panel 101. The front panel 102 is, for example, between about 4 inches and about 36 inches wide. The base panel 101 is, for example, between about 4 inches and about 36 inches wide and between about 12 inches and about 48 inches long. The side panels 103 are positioned at opposing ends 102c and 102d of the front panel 102. In an embodiment, each of the side panels 103 extends taperedly to the tail area 112 of the base panel 101 as exemplarily illustrated in FIG. 1A, FIG. 3A, FIG. 3C, FIG. 9, FIG. 12B, and FIG. 14A. The side panels 103 are, for example, about 2 inches to about 8 inches high and between about 12 inches and about 48 inches long. The side panels 103 extend in height above the front panel 102, for example, by about ⅛ of an inch to about 2 inches. In an embodiment, the side panels 103 reduce from their full height of, for example, about 2 inches or about 8 inches at the intersection with the rear panel assembly 106 down to a point, for example, about 1 inch to about 2½ inches short of the up-roof edge 118 of the tail area 112.

In an embodiment as exemplarily illustrated in FIGS. 1A-1C, FIGS. 3A-3C, FIG. 9, FIG. 11A, FIGS. 12A-12B, and FIG. 14A, each of the side panels 103 comprises a first side section 104 and a second side section 105. The first side section 104 of each of the side panels 103 defines a nested area 110 along with the front panel 102 and the base panel 101. The second side section 105 of each of the side panels 103 outwardly offsets from the first side section 104. The second side section 105 in conjunction with the tail area 112 of the base panel 101 defines a nesting area 111. The nesting area 111 of a downslope roofing apparatus 100b is configured to support the nested area 110 of an upslope roofing apparatus 100a as exemplarily illustrated in FIG. 3B. As used herein, the term "downslope roofing apparatus" refers to a roofing apparatus 100b or 100c connected downslope from another roofing apparatus 100a or 100b, towards a bottom edge 301d of a sloped roof 301 as exemplarily illustrated in FIG. 6. Also, as used herein, the term "upslope roofing apparatus" refers to a roofing apparatus 100a connected upslope from another roofing apparatus 100b, towards a top edge 301c of a sloped roof 301 as exemplarily illustrated in FIG. 5. The nesting area 111 and the nested area 110 are divided by an offset 103b defined between the first side section 104 and the second side section 105 of each of the side panels 103. The first side section 104 of each of the side panels 103 is proximal to the front panel 102. The second side section 105 of each of the side panels 103 is proximal to the rear panel assembly 106. This configuration of the side panels 103, for example, increases the efficiency of the water shedding function of the roofing apparatus 100 by preventing excessive spillage to the sides, increases coverage of the roof 301 with the planted media 401, and better enables, for example, about 3 inch depths of growth media 402 and water capacity to be maintained in the enclosure 107.

The rear panel assembly 106 is positioned parallel and opposite to the front panel 102 at a predetermined distance from the front panel 102. The rear panel assembly 106 is configured to direct runoff received from the tail area 112 of the base panel 101 into the enclosure 107 of the roofing apparatus 100. The term "runoff" refers to water unused, not absorbed, not transpired, etc., by the roofing materials 401 and 402 contained in the enclosure 107 of the roofing apparatus 100. The runoff provides moisture to the roofing materials 401 and 402 contained in the enclosure 107 of the roofing apparatus 100. The runoff comprises, for example, rainfall runoff, runoff from an irrigation system 501 provided on the roof 301 as exemplarily illustrated in FIG. 5, etc. In an embodiment as exemplarily illustrated in FIG. 1A, FIG. 2B, FIG. 3A, FIG. 9, and FIG. 13A, the rear panel assembly 106 comprises multiple rear segments 106a separated by a predetermined distance from each other. The rear segments 106a are connected at the top edge 106c of the rear panel assembly 106 as exemplarily illustrated in FIG. 1A, FIG. 2B, FIG. 3A, FIG. 9, and FIG. 13A. The rear segments 106a define slots 106b therebetween configured to direct the received runoff from the tail area 112 of the base panel 101 into the enclosure 107 of the roofing apparatus 100 through the slots 106b. The rear segments 106a are aligned to form a wall with multiple slots 106b between the rear segments 106a for forming the rear panel assembly 106. The slots 106b allow the runoff to enter the enclosure 107. Each of the rear segments 106a are, for example, about 2 inches to about 8 inches high and about ½ an inch to about 6 inches wide.

The side panels 103 which are greater in height than the front panel 102 contain runoff that does not enter the enclosure 107, for example, through the slots 106b defined between the rear segments 106a of the rear panel assembly 106 but passes over the roofing materials 401 and 402. The front panel 102, which is lower in height compared to the side panels 103, allows runoff that passes over the top of the roofing materials 401 and 402 to pass out of the top edge 102b of the front panel 102 of an upslope roofing apparatus 100a or 100b to the tail area 112 of a downslope roofing apparatus 100b or 100c as exemplarily illustrated in FIG. 6. The roofing apparatus 100 disclosed herein functions regardless of the amount of runoff trapped within the enclosure 107.

The tail area 112 of the base panel 101 extends beyond the rear panel assembly 106. The tail area 112 of the base panel 101 of a downslope roofing apparatus 100b or 100c is configured to receive runoff from an upslope roofing apparatus 100a. In a roofing system 300 comprising multiple connected roofing apparatuses 100a, 100b, and 100c as exemplarily illustrated in FIGS. 3A-3C, FIG. 4A, FIGS. 5-6, FIGS. 8A-8B, FIG. 14B, and FIG. 15B, the tail area 112 of the base panel 101 of a downslope roofing apparatus 100b or 100c receives runoff from an upslope roofing apparatus 100a or 100b. As exemplarily illustrated in FIG. 3A, FIG. 3C, FIG. 4A, FIGS. 5-6, FIG. 14B, and FIG. 15B, a second roofing apparatus 100b is positioned between a first roofing apparatus 100a and a third roofing apparatus 100c. The third roofing apparatus 100c is connected downslope from the second roofing apparatus 100b on the roof 301. The first roofing apparatus 100a connected upslope from the second roofing apparatus 100b on the roof 301 is herein referred to as an "upslope roofing apparatus". The third roofing apparatus 100c connected downslope from the second roofing apparatus 100b on the roof 301 is herein referred to as a "downslope roofing apparatus". The second roofing apparatus 100b is herein referred to as an "intermediate roofing apparatus". The tail area 112 of the base panel 101 of the intermediate roofing apparatus 100b collects the runoff from the upslope roofing apparatus 100a and holds the runoff, until the runoff can pass through the slots 106b defined between the rear segments 106a of the rear panel assembly 106 into the enclosure 107 of the intermediate roofing apparatus 100b. The slots 106b in the rear panel assembly 106 are openings for the runoff from the upslope roofing apparatus 100a to pass into the enclosure 107 of the intermediate roofing apparatus 100b for use as irrigation for the plantings 401 and for treatment of pollutants.

In an embodiment, the roofing apparatus 100 disclosed herein further comprises multiple orifices 108 and 109 positioned on the front panel 102. The orifices 108 and 109 are configured to release the received runoff from an upslope roofing apparatus 100a to a roofing apparatus 100b connected downslope from the upslope roofing apparatus 100a on the roof 301. For example, the orifices 108 and 109 on the front panel 102 of the upslope roofing apparatus 100a release the received runoff from the upslope roofing apparatus 100a to the intermediate roofing apparatus 100b. The orifices 108 and 109 on the front panel 102 of the intermediate roofing apparatus 100b release the received runoff from the intermediate roofing apparatus 100b to the downslope roofing apparatus 100c. The orifices 108 and 109 are also configured to drain the received runoff from the roof 301.

The orifices 108 and 109 positioned on the front panel 102 comprise, for example, low flow orifices 108 and high flow orifices 109. The low flow orifices 108 are positioned proximal to the bottom edge 102a of the front panel 102. The high flow orifices 109 are positioned above the low flow orifices 108 and proximal to the top edge 102b of the front panel 102. The high flow orifices 109 are configured to release the received runoff from an upslope roofing apparatus 100a or 100b to a downslope roofing apparatus 100b or 100c, and/or to drain the received runoff from the roof 301. The low flow orifices 108 and the high flow orifices 109 are herein collectively referred to as "orifices". The combined area of the orifices 108 and 109 on the front panel 102 is, for example, a minimum of about 0.5 square inches to about 2 square inches depending on the design precipitation. The orifices 108 and 109 are sized and positioned on the front panel 102 of the roofing apparatus 100 for releasing the runoff slowly in order to enable irrigation of the plantings 401 in the enclosure 107. The orifices 108 and 109 thereby provide sufficient drainage for the roofing materials 401 and 402 in the enclosure 107.

The top edge 102b of the front panel 102 is defined at a predetermined distance below a top edge 103a of each of the side panels 103. The top edge 102b of the front panel 102 is configured to drain excess runoff from the enclosure 107. The enclosure 107 stores the runoff until the runoff can pass through the roofing apparatus 100. The enclosure 107 also receives rainfall directly. Some of the runoff from the rainfall is filtered, evaporated, and taken up by the plantings 401 contained in the enclosure 107 and transpired. Runoff that is not evaporated, unused, etc., in the enclosure 107 passes through the roofing materials 401 and 402 to the front panel 102 of the enclosure 107. The runoff is trapped in the enclosure 107 until the runoff can seep out of the roofing apparatus 100 through the orifices 108 and 109 or via the top edge 102b of the front panel 102. The low flow orifices 108 allow minimal runoff or low intensity runoff in the enclosure 107 to drain out of the roofing apparatus 100a or 100b to the tail area 112 of the roofing apparatus 100b or 100c. The high flow orifices 109 allow increased runoff or high intensity runoff in the enclosure 107 to drain out of the roofing apparatus 100a or 100b to the tail area 112 of the roofing apparatus 100b or 100c.

In an embodiment, a pooling area 117 is defined in the tail area 112 proximal to the rear panel assembly 106. The pooling area 117 is configured to temporarily hold the received runoff from flowing into the enclosure 107. The runoff enters the enclosure 107 of the roofing apparatus 100 due to a pressure head build up when the runoff pools in the pooling area 117 of the tail area 112 of the base panel 101. The pooling area 117 is located at the intersection of the tail area 112 and the enclosure 107. The pooling area 117 temporarily holds the runoff. The side panels 103 contain the runoff in the pooling area 117. The pooling of the runoff in the pooling area 117 contributes to management of hydromodification by delaying the more frequent, lower intensity rainfall, and allowing volume reducing effects, for example, evaporation to occur. The slots 106b defined between the rear segments 106a of the rear panel assembly 106 allow the runoff from the pooling area 117 to enter the enclosure 107. The roofing apparatus 100 is installed on a sloped roof 301 such that elevation of an up-roof edge 118 of the tail area 112 is higher than the elevation of the highest point or the top edge 106c of the rear panel assembly 106 in order to ensure that the runoff spills over the rear panel assembly 106 before the runoff spills over the up-roof edge 118 of the tail area 112.

In an embodiment, the roofing apparatus 100 disclosed herein further comprises pre-drilled nail holes 116 in the base panel 101. The pre-drilled nail holes 116 are configured to allow a fastener, for example, a nail to attach the roofing apparatus 100 to a roofing batten 302 on the roof 301 as exemplarily illustrated in FIG. 3C, FIG. 4A, FIGS. 5-6, FIG. 14B, and FIG. 15B. In an embodiment as exemplarily illustrated in FIG. 1C, the roofing apparatus 100 disclosed herein further comprises a batten anchor 119 positioned on an underside surface 101a of the base panel 101. The batten anchor 119 is configured to interface the roofing apparatus 100 with a roofing batten 302 on the roof 301. The batten anchor 119 extends continuously along the length of the base panel 101 on the underside surface 101a of the base panel 101 as exemplarily illustrated in FIG. 2B. The roofing apparatus 100 disclosed herein further comprises a side notch 113, a side key 114, and a key notch 115 as disclosed in the detailed description of FIGS. 2A-2B.

Figure 2A:
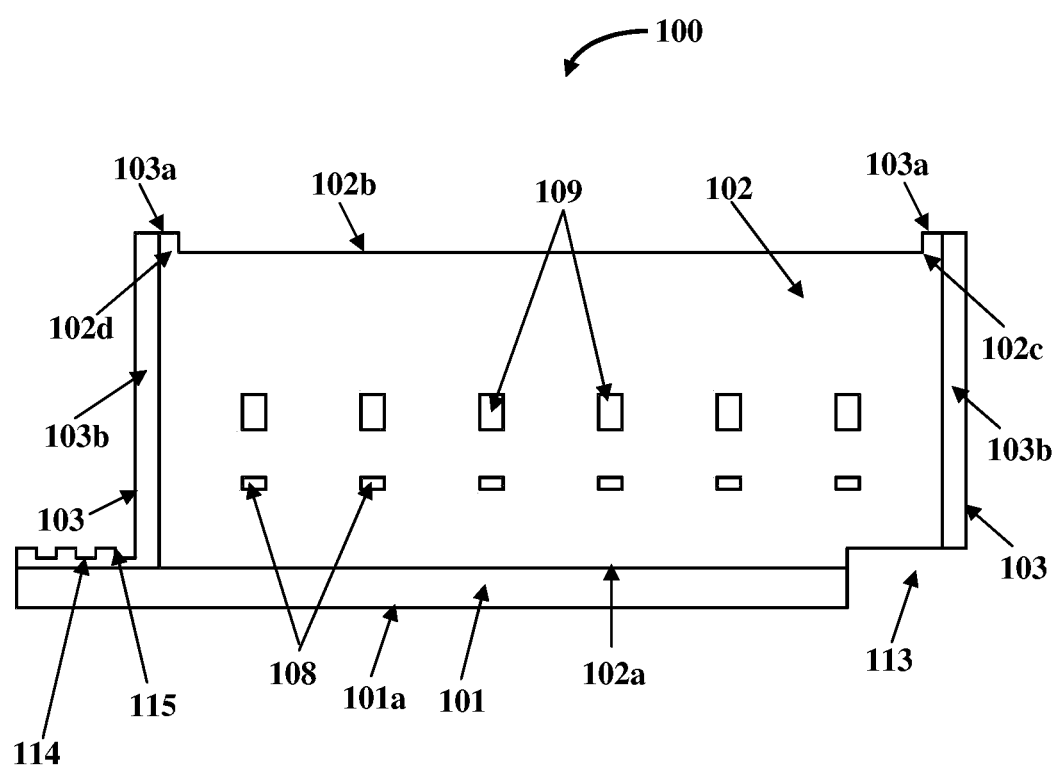
FIG. 2A exemplarily illustrates a front elevation view of the roofing apparatus, showing a side notch, a side key, and a key notch.
Figure 2B:
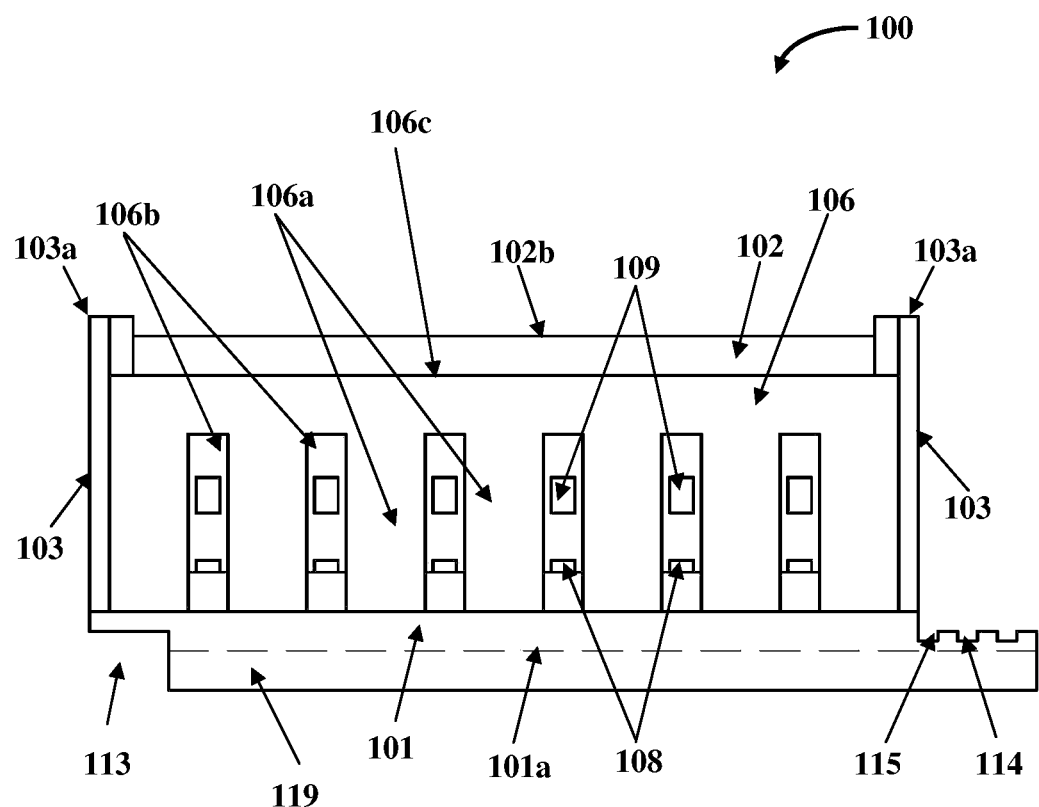
FIG. 2B exemplarily illustrates a rear elevation view of the roofing apparatus, showing a side notch, a side key, and a key notch.

FIGS. 2A-2B exemplarily illustrate a front elevation view and a rear elevation view, respectively of the roofing apparatus 100, showing a side notch 113, a side key 114, and a key notch 115. The side notch 113 extends along a length of one of the side panels 103. The side notch 113 of a roofing apparatus 100a is configured to engage with the side key 114 of an adjacent roofing apparatus 100b as exemplarily illustrated in FIG. 4B. The side notch 113 is, for example, a female side wall that enables interfacing of the roofing apparatus 100a with the side key 114 of an adjacent roofing apparatus 100b. The side key 114 extends along a length of another one of the side panels 103 and enables interfacing of the roofing apparatus 100b with the side notch 113 of an adjacent roofing apparatus 100a as exemplarily illustrated in FIG. 4B. The key notch 115 extends outwardly along the length of one of the side panels 103. The key notch 115 provides a conduit that allows flow of runoff along an interface defined between connected roofing apparatuses 100a, 100b, and 100c as exemplarily illustrated in FIGS. 3A-3B. The key notch 115 facilitates flow of the runoff along an interface defined between adjacent roofing apparatuses 100a and 100b as exemplarily illustrated in FIG. 4B.

The roofing apparatus 100 disclosed herein is constructed, for example, from recycled plastic, clay composite, reinforced concrete, or similar materials with minimum tensile and shear strengths sufficient for an intended use of the roofing apparatus 100. For example, the roofing apparatus 100 is constructed as a lightweight tile that is produced with a blend of recycled materials and developed from castings of natural clay barrel tiles to deliver a natural appearance. The roofing apparatus 100 disclosed herein is constructed to conform to a weight that does not exceed the support limits of the roof 301. The weight of the roofing apparatus 100 including the roofing materials 401 and 402 exemplarily illustrated in FIGS. 4A-4B, FIGS. 5-6, FIGS. 8A-8B, FIG. 14B, and FIG. 15B is, for example, 10 pounds per square foot, which is the typical dead load of a sloped roof 301. The low weight enables existing homes, corporate buildings, etc., to be re-roofed and enables new homes, corporate buildings, etc., to be designed and built using the roofing apparatus 100 disclosed herein with no additional construction costs.

Figure 3A:
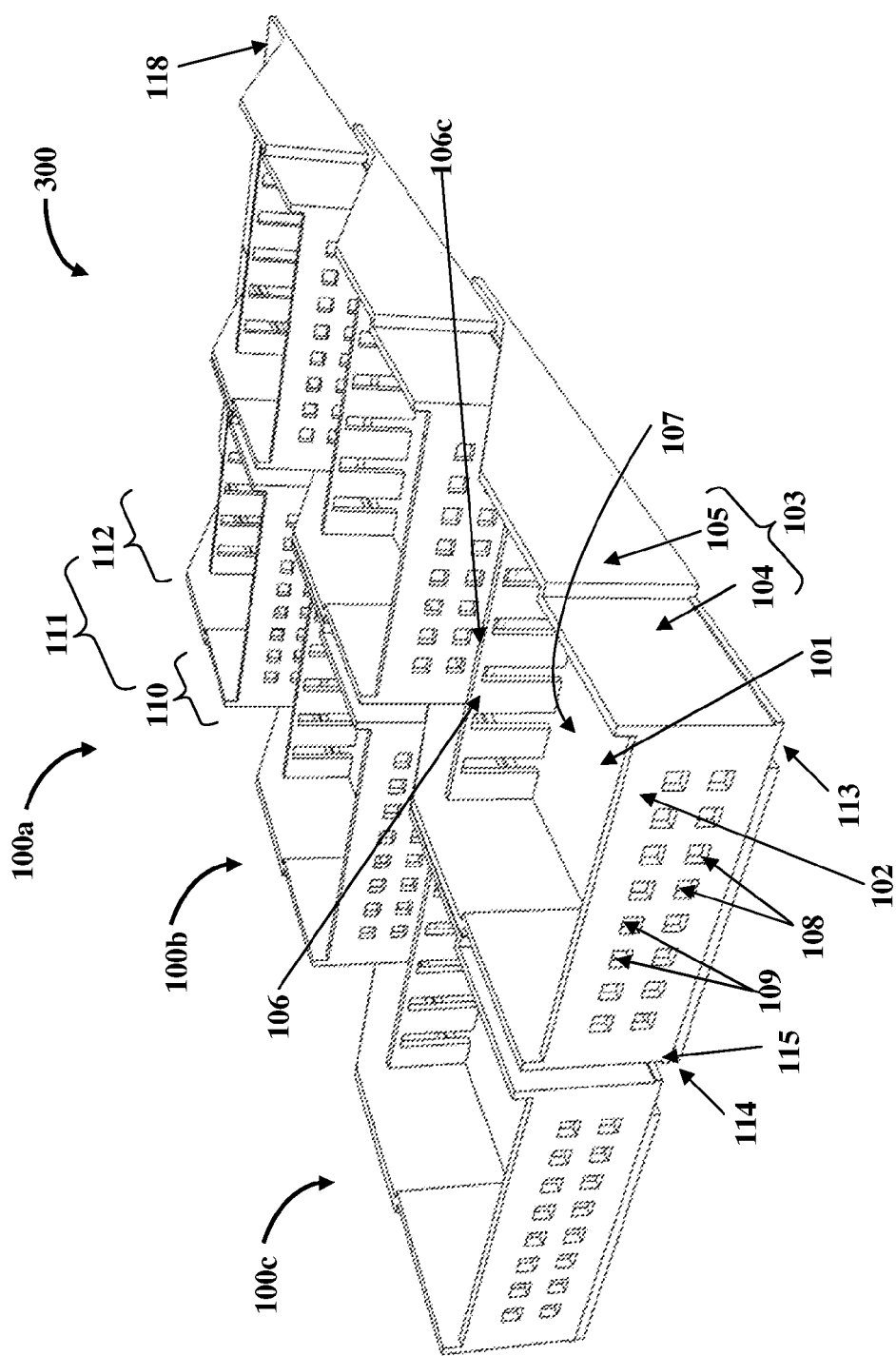
FIG. 3A exemplarily illustrates an isometric view of a roofing system comprising connected roofing apparatuses.
Figure 3B:
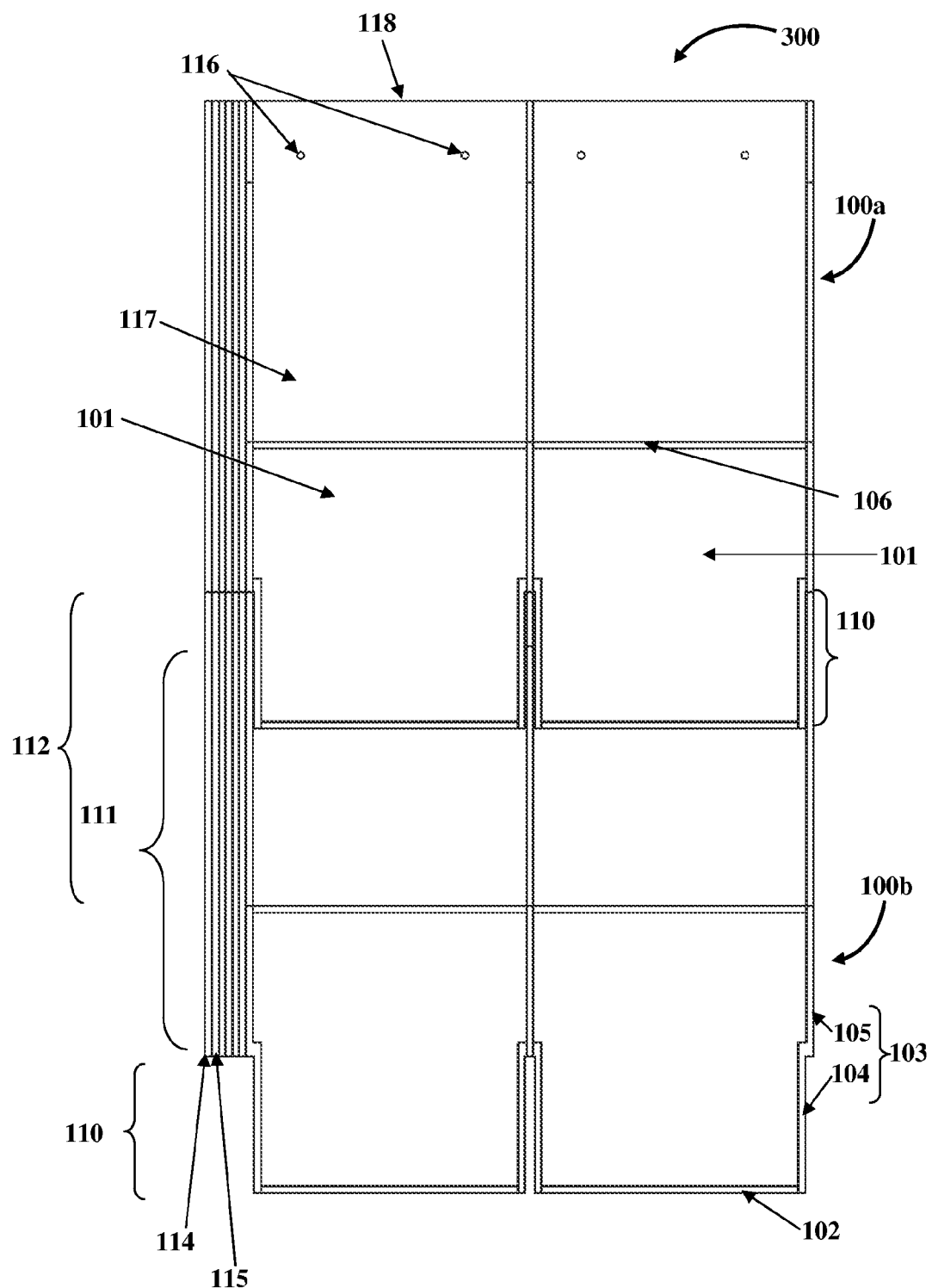
FIG. 3B exemplarily illustrates a plan view of a roofing system comprising connected roofing apparatuses.
Figure 3C:
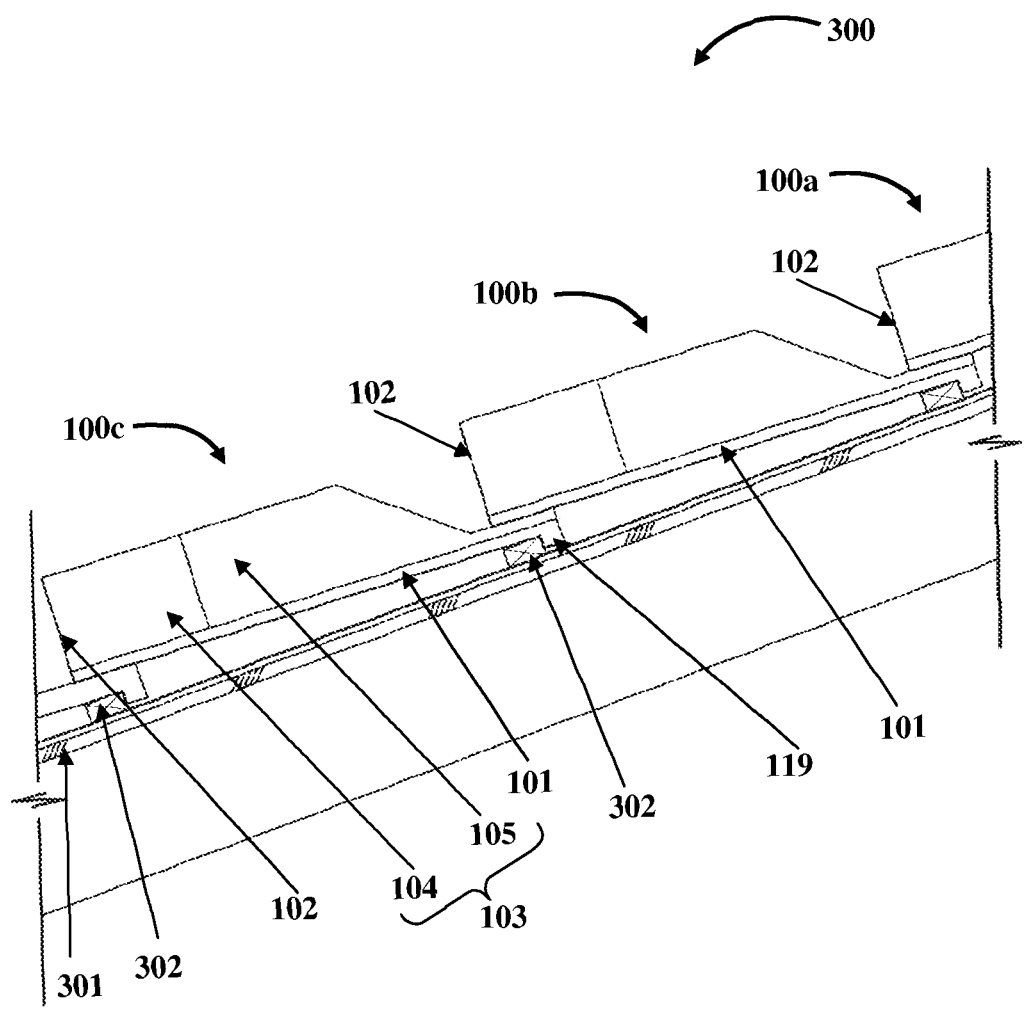
FIG. 3C exemplarily illustrates a side elevation view of the roofing system comprising connected roofing apparatuses on a roof.

FIGS. 3A-3C exemplarily illustrate an isometric view, a plan view, and a side elevation view, respectively of a roofing system 300 comprising connected roofing apparatuses 100a, 100b, and 100c. As used herein, the term "roofing system" refers to a system comprising connected roofing apparatuses 100a, 100b, and 100c positioned on a roof 301 of a building along with a drainage system (not shown) and an irrigation system 501 as exemplarily illustrated in FIGS. 5-6. The roofing system 300 partially or completely covers the roof 301 with roofing materials, for example, plantings 401 and growth media 402, contained in the enclosure 107 of each of the roofing apparatuses 100a, 100b, and 100c as exemplarily illustrated in FIGS. 5-6. The roofing system 300 comprises multiple individual roofing apparatuses 100a, 100b, and 100c aligned, nested, and keyed into each other as a system 300. For example, the side key 114 of the roofing apparatus 100b allows for interfacing with the side notch 113 of an adjacent roofing apparatus 100a as exemplarily illustrated in FIG. 4B. The roofing system 300 comprises multiple roofing apparatuses 100a, 100b, and 100c juxtaposed to each other in a predetermined alignment or a predefined configuration as exemplarily illustrated in FIGS. 3A-3C. For example, the roofing system 300 comprises upslope roofing apparatuses 100a, intermediate roofing apparatuses 100b, and downslope roofing apparatuses 100c. The upslope roofing apparatuses 100a are connected upslope from the intermediate roofing apparatuses 100*b*. The downslope roofing apparatuses 100*c* are connected downslope from the intermediate roofing apparatuses 100*b* on the roof 301 as exemplarily illustrated in FIG. 3C.

In an embodiment, the nested area 110 of a roofing apparatus 100*a* of the roofing system 300 rests on the nesting area 111 of a roofing apparatus 100*b* connected downslope from the roofing apparatus 100*a* as exemplarily illustrated in FIG. 3B. Installation of the roofing system 300 disclosed herein on the roof 301 is similar to the installation of standard tile and shake roof systems and therefore does not require additional structural support. Moreover, the roofing system 300 disclosed herein functions similar to conventional roofs 301 and therefore does not require additional or complicated drainage systems.

The roofing apparatus 100, exemplarily illustrated in FIGS. 1A-1C and FIGS. 2A-2B, manages rainfall runoff in two methods as opposed to a single method used by conventional roofs. One method for managing rainfall runoff comprises management of rainfall runoff from frequent, low intensity rainfall on a sloped roof 301 and the other method for managing rainfall runoff comprises management of rainfall runoff from less frequent, high intensity rainfall on the sloped roof 301. The roofing apparatus 100 captures the frequent low intensity rainfall in the enclosure 107 and uses the frequent low intensity rainfall, for example, for supplementing the irrigation of the roofing materials 401 and 402 contained within the enclosure 107 on the roof 301, for physical and biological filtering and treatment of the rainfall for water quality management; and also for the delay, evaporation, and transpiration of the rainfall for hydromodification management. The roofing apparatus 100*c* disposes the runoff from less frequent, high intensity rainfall to an eave 301*b* of the roof 301 exemplarily illustrated in FIG. 6, thereby performing a water shedding function on the roof 301. The enclosure 107 holds the runoff from the high intensity rainfall until the runoff can pass over the top edge 102*b* of the front panel 102 of the roofing apparatus 100*c*.

The roofing apparatus 100 disclosed herein functions on sloped roofs 301, for example, with a minimum roof pitch of 3 vertical to 12 horizontal and a maximum roof pitch of 6 vertical to 12 horizontal. The length of the base panel 101 determines the length of the tail area 112 of the roofing apparatus 100. Since the tail area 112 must only be long enough to prevent the runoff that accumulates behind the rear panel assembly 106 from overtopping the up-roof edge 118 of the tail area 112 of the roofing apparatus 100, the base panel 101 can be shorter on roofing systems 300 installed on roofs 301 that are steeper than 3 vertical to 12 horizontal. Installing the roofing system 300 on steeper roofs 301 allows for a greater ratio of length of the enclosure 107 to the length of the tail area 112.

Figure 4A:
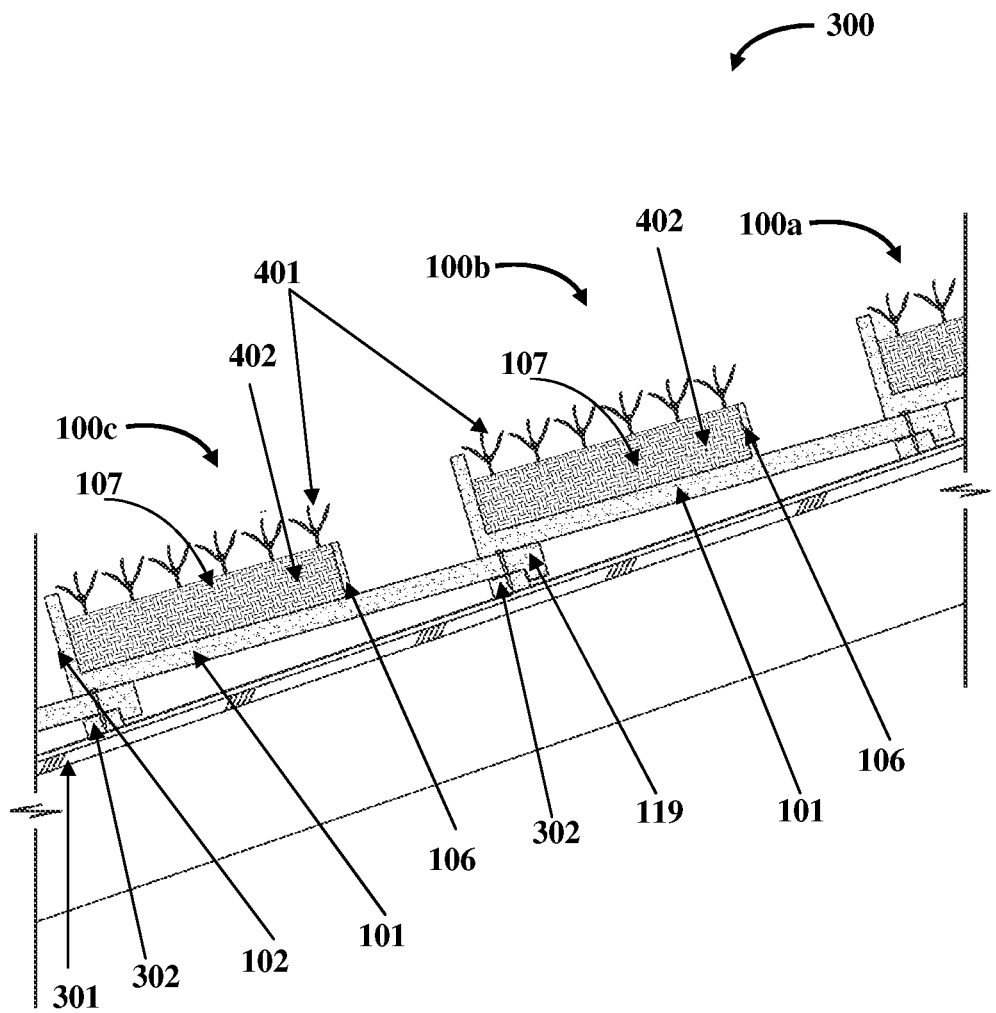
FIG. 4A exemplarily illustrates a side sectional view of roofing apparatuses connected to each other to create the roofing system, showing roofing materials contained in an enclosure of each of the roofing apparatuses.
Figure 4B:
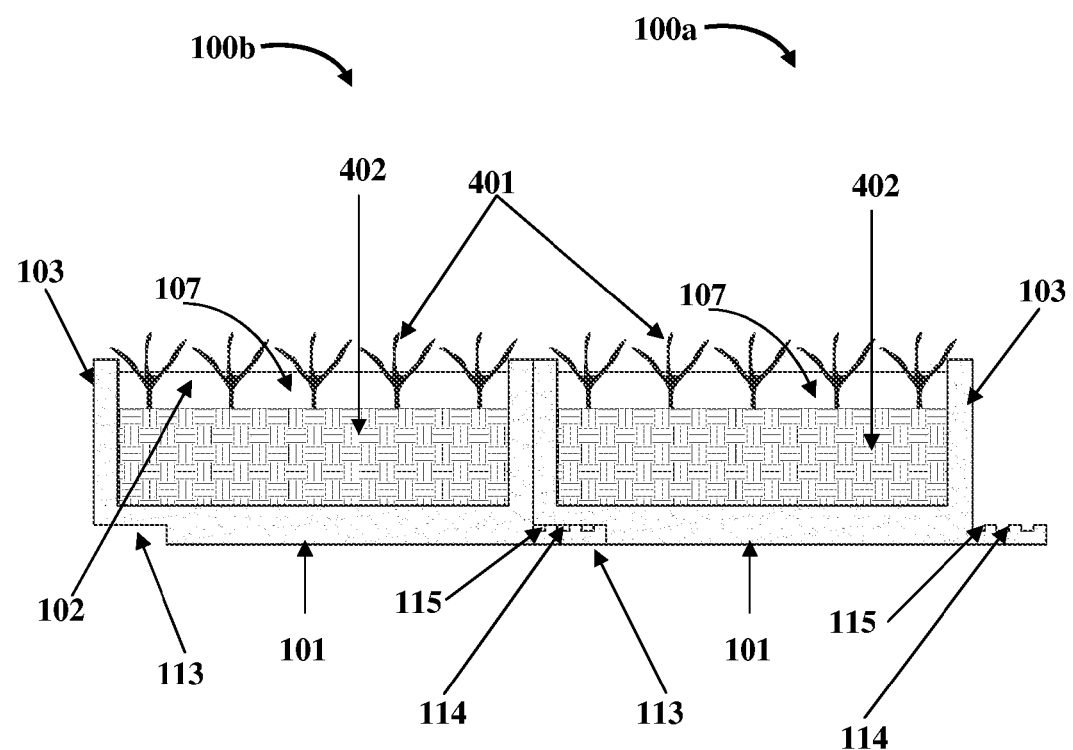
FIG. 4B exemplarily illustrates a rear sectional view of roofing apparatuses connected adjacent to each other, showing roofing materials contained in the enclosure of each of the adjacent roofing apparatuses.

FIGS. 4A-4B exemplarily illustrate a side sectional view and a rear sectional view, respectively of roofing apparatuses 100*a*, 100*b*, and 100*c* connected to each other to create the roofing system 300, showing roofing materials 401 and 402 contained in an enclosure 107 of each of the roofing apparatuses 100*a*, 100*b*, and 100*c*. FIG. 4A exemplarily illustrates the side sectional view of the intermediate roofing apparatus 100*b* positioned and connected between the upslope roofing apparatus 100*a* and the downslope roofing apparatus 100*c*. FIG. 4B exemplarily illustrates a rear sectional view of two roofing apparatuses 100*a* and 100*b* assembled adjacent to each other. The roofing apparatuses 100*a*, 100*b*, and 100*c* exemplarily illustrated in FIGS. 4A-4B are aligned and keyed into each other as a roofing system 300 as exemplarily illustrated in FIG. 4A.

Figure 5:
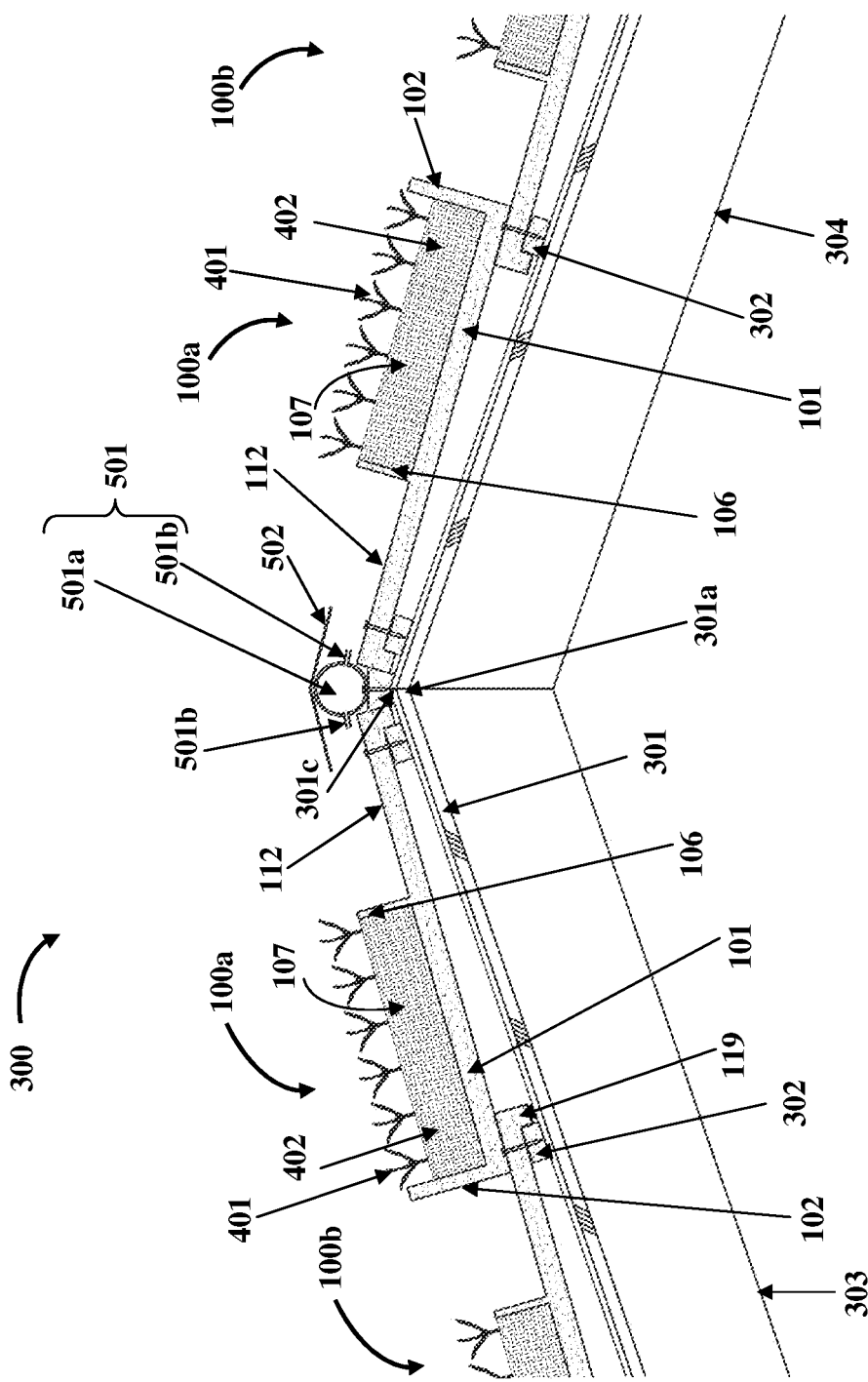
FIG. 5 exemplarily illustrates a partial sectional view of the roofing system, showing roofing apparatuses positioned proximal to a ridge of a roof and an irrigation system incorporated into the roofing system.

FIG. 5 exemplarily illustrates a partial sectional view of the roofing system 300, showing roofing apparatuses 100*a* and 100*b* positioned proximal to a ridge 301*a* of a roof 301 and an irrigation system 501 incorporated into the roofing system 300. The roofing apparatus 100*a* or 100*b* disclosed herein is configured for installation similar to installation of normal tile roofs or shake roofs. The ridge 301*a* of the roof 301 refers to the top of the roof 301 at the junction of two sloping sides 303 and 304 of the roof 301. The roofing apparatuses 100*a* proximal to the ridge 301*a* are aligned and keyed into respective roofing apparatuses 100*b* connected downslope from the roofing apparatuses 100*a* as a roofing system 300. Roof flashings 502 join the two roofing apparatuses 100*a* at the ridge 301*a* of the roofing system 300. The irrigation system 501 of the roofing system 300 comprises a primary delivery tube 501*a* and multiple lateral delivery tubes 501*b* for irrigating the roofing materials 401 and 402 contained in the enclosure 107 of each of the roofing apparatuses 100*a*. The primary delivery tube 501*a* is attached to an underside of the roof flashings 502. The lateral delivery tubes 501*b* are connected perpendicular to the primary delivery tube 501*a*, for example, at about 9 inch intervals. Additional irrigation systems can be incorporated into the roofing system 300 depending on the climate, materials, and plantings 401 contained in the roofing apparatuses 100*a* and 100*b*. The irrigation system 501 is configured as a one point system at the ridge 301*a* of the roof 301 that relies on gravity to deliver water to the plantings 401 from the ridge 301*a* of the roof 301 to an eave 301*b* of the roof 301 exemplarily illustrated in FIG. 6, and ultimately to drainage gutters and downspouts.

Figure 6:
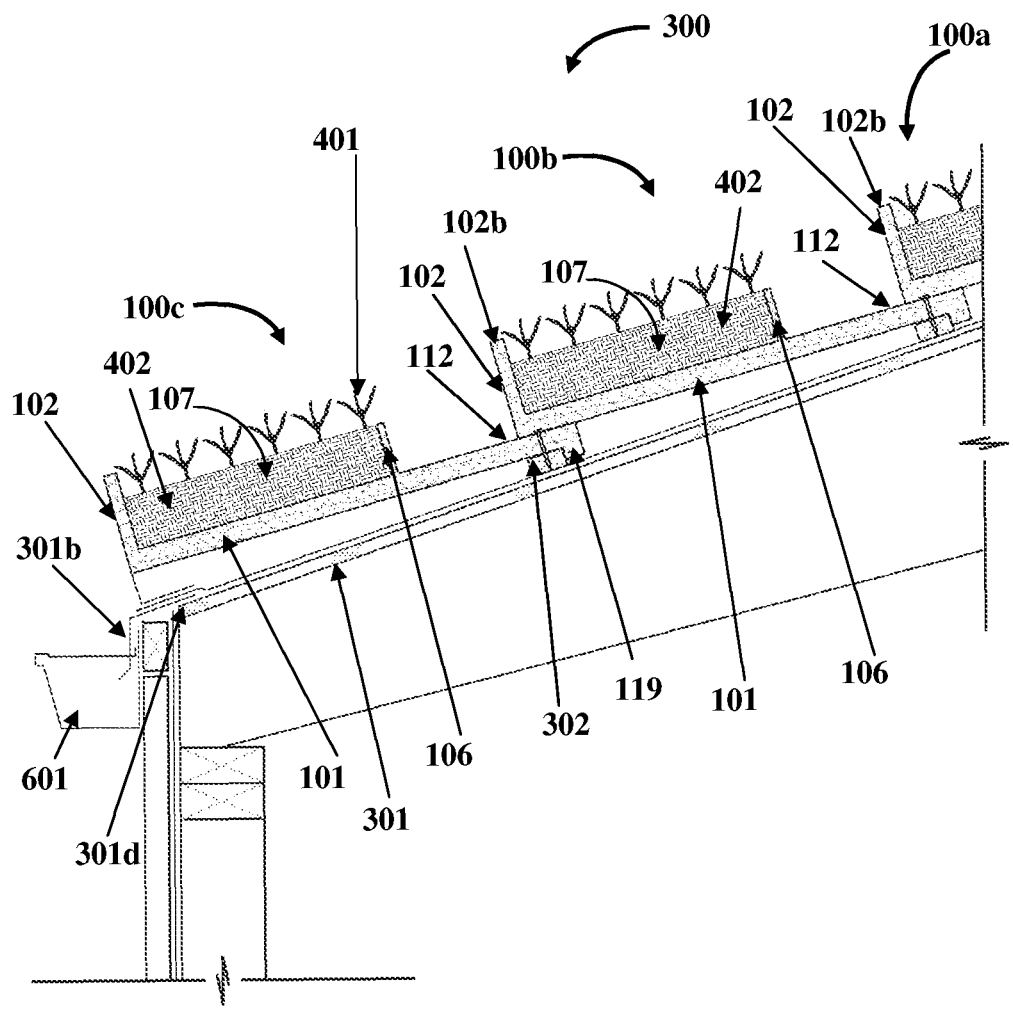
FIG. 6 exemplarily illustrates a partial sectional view of the roofing system, showing one of the roofing apparatuses of the roofing system terminating at an eave of a roof.

FIG. 6 exemplarily illustrates a partial sectional view of the roofing system 300, showing one of the roofing apparatuses 100*a*, 100*b*, and 100*c* of the roofing system 300 terminating at an eave 301*b* of a roof 301. The eave 301*b* of the roof 301 is positioned below the bottom edge 301*d* of the roof 301. The roofing apparatus 100*c* at the eave 301*b* of the roof 301 is aligned, keyed into, and supports a respective roofing apparatus 100*b* connected upslope from the roofing apparatus 100*c* in the roofing system 300. FIG. 6 also exemplarily illustrates a roof gutter 601 positioned below the eave 301*b* of the roof 301. The roof gutter 601 collects and diverts the runoff drained from the roof 301.

Figure 7A:
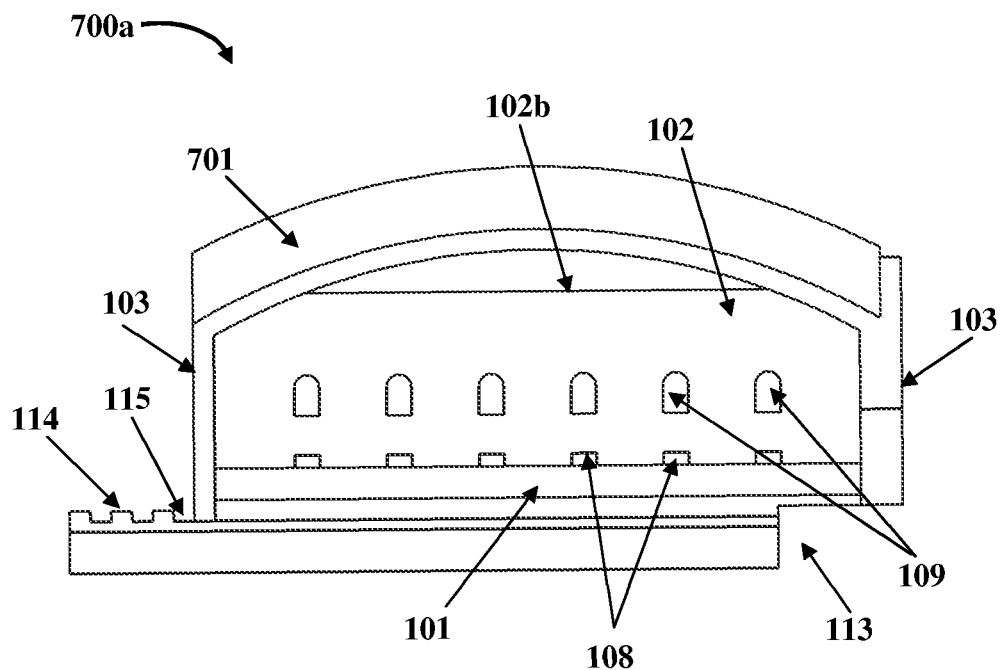
FIGS. 7A-7B exemplarily illustrate elevation views of roofing apparatuses in different styles.
Figure 7B:
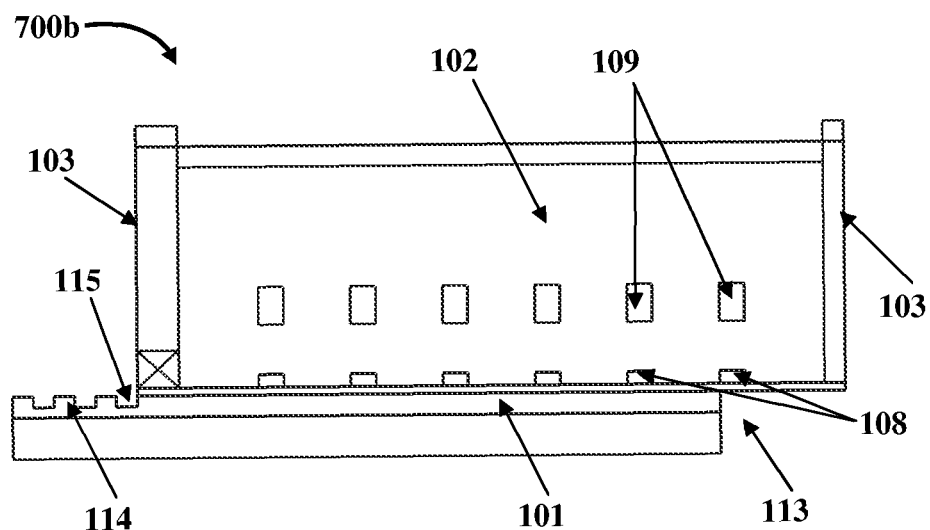

FIGS. 7A-7B exemplarily illustrate elevation views of the roofing apparatuses 700*a* and 700*b* in different styles. The design of the roofing apparatus 100, exemplarily illustrated in FIGS. 1A-1C and FIGS. 2A-2B, can be customized to provide aesthetically pleasing architectural value to a roof 301 exemplarily illustrated in FIG. 3C, FIG. 4A, FIGS. 5-6, FIG. 10, FIG. 14B, and FIG. 15B. FIG. 7A exemplarily illustrates a Spanish style roofing apparatus 700*a*. The Spanish style roofing apparatus 700*a* comprises an arch 701 attached to the top edge 102*b* of the front panel 102. FIG. 7B exemplarily illustrates a Craftsman style roofing apparatus 700*b*. The roofing apparatus 100, 700*a*, or 700*b* is composed of the following aesthetic features: a face style, that is, the design of the front panel 102, color of the roofing apparatus 100, 700*a*, or 700*b*, and color and/or texture of the plantings 401. The face style has infinite design possibilities and can be, for example, plain or ornate, curved or angular, and organic or geometric in order to achieve a desired architectural style. The color of the roofing apparatus 100, 700*a*, or 700*b* is chosen such that the color complements the face style. The color of the roofing apparatus 100, 700*a*, or 700*b* is, for example, brown, terra cotta, black, etc. In an example, a terra cotta color for the roofing apparatus 100, 700*a*, or 700*b* is used with a curving face style to create a Spanish style roofing apparatus 700a or a Mediterranean style roofing apparatus (not shown).

The plantings 401 contained in the enclosure 107 of the roofing apparatus 100, 700a, or 700b disclosed herein are, for example, sedums. Sedums are low growing succulent plants with thick, fleshy leaves and stems that are particularly suitable for growing in inhospitable conditions found, for example, on a roof 301. Sedums have shallow roots and absorb morning dew to rehydrate during extended sunny and windy periods of drought and can thereby withstand periods of low rainfall, strong drying winds, heat, etc. There are about 400 species of sedum, which provides many possibilities in choosing the color and/or texture thereof to reinforce the face style and the color of the roofing apparatus 100, 700a, or 700b. For example, sedum spathulifolium purpureum, a dense and low growing plant with leaves having a reddish hue is an appropriate addition to the curved face and terra cotta colored Spanish style roofing apparatus 700a or the Mediterranean style roofing apparatus.

The growth media 402 contained in the enclosure 107 of the roofing apparatus 100, 700a, or 700b is engineered soil that is lightweight, has good water storage characteristics, low organic content, suitable chemical parameters, and a good distribution of particle sizes. The growth media 402 contained in the enclosure 107 of each of the roofing apparatuses 100a, 100b, 100c, etc., in the roofing system 300 exemplarily illustrated in FIG. 4A, FIGS. 5-6, FIGS. 8A-8B, FIG. 14B, and FIG. 15B makes the roof 301 lighter than other roofs 301 using other types of soil.

Figure 8A:
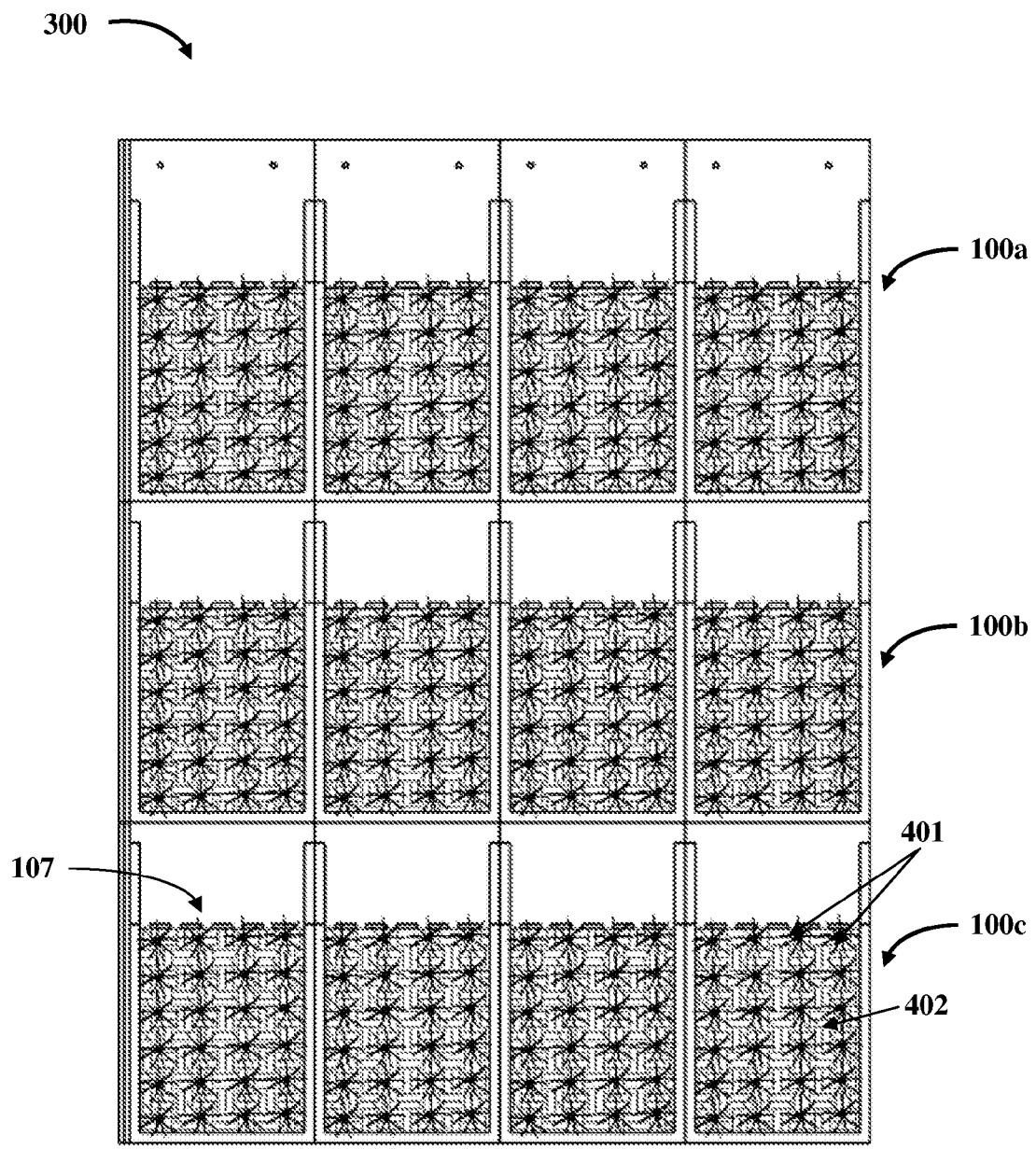
FIGS. 8A-8B exemplarily illustrate plan views of different configurations of connected roofing apparatuses in a roofing system.
Figure 8B:
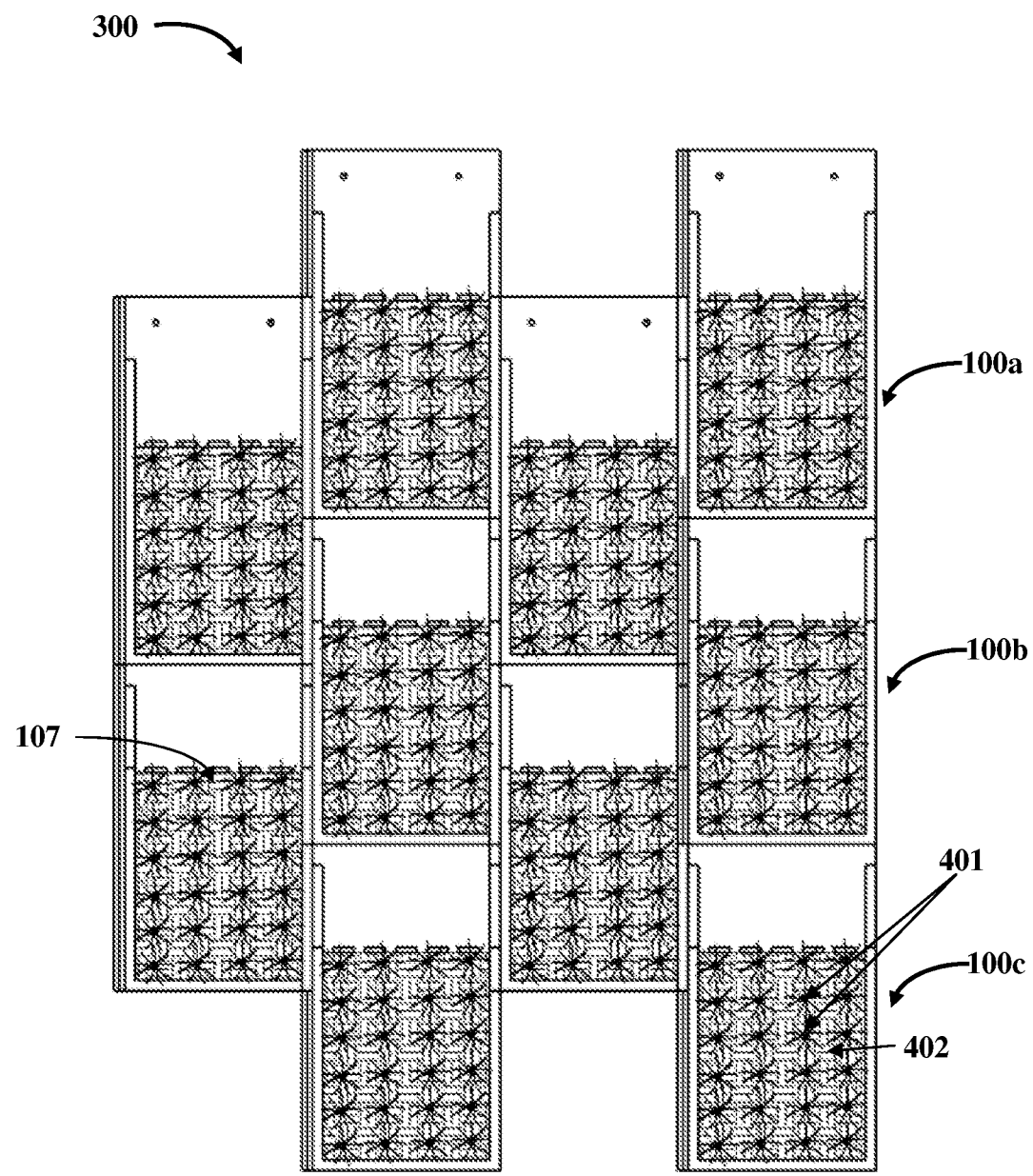

FIGS. 8A-8B exemplarily illustrate plan views of different configurations of connected roofing apparatuses 100a, 100b, and 100c in a roofing system 300. The roofing apparatuses 100a, 100b, and 100c in the roofing system 300 can be connected in multiple different configurations, for example, an upslope configuration, a downslope configuration, an adjacent configuration, a row configuration, a column configuration, and any geometrical configuration. FIG. 8A exemplarily illustrates a configuration of the roofing system 300 in which the roofing apparatuses 100a, 100b, and 100c are aligned in a row. In another configuration, the roofing apparatuses 100a, 100b, and 100c in the roofing system 300 are arranged, for example, as displaced columns as exemplarily illustrated in FIG. 8B. The irrigation system 501, exemplarily illustrated in FIG. 5, in each configuration of the roofing system 300 can be supplemented with additional primary delivery tubes 501a and lateral delivery tubes 501b, if required, due to a large distance from the ridge 301a of the roof 301 to the eave 301b of the roof 301 exemplarily illustrated in FIG. 6.

Figure 9:
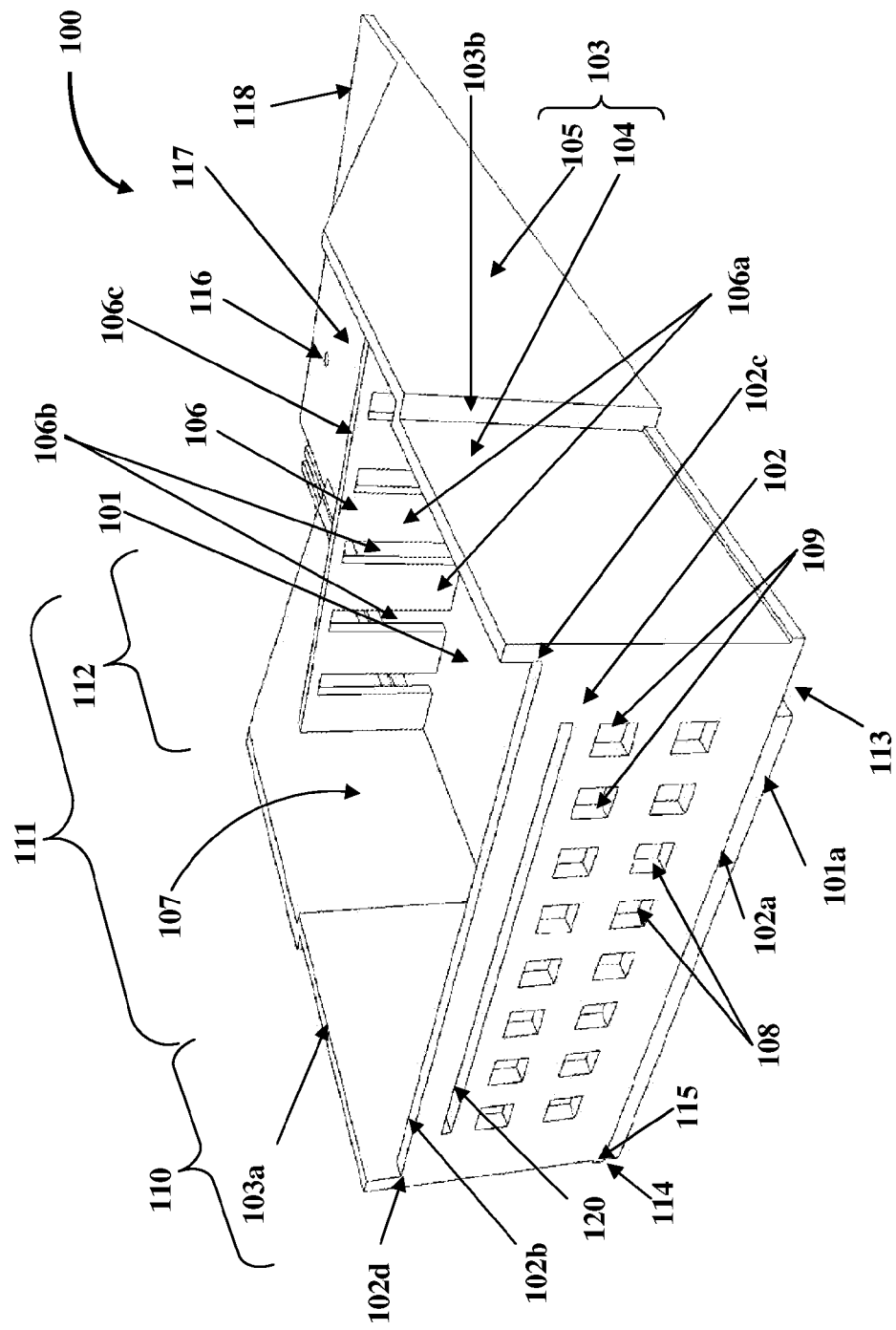
FIG. 9 exemplarily illustrates an isometric view of an embodiment of the roofing apparatus, showing a weir positioned on a front panel of the roofing apparatus.

FIG. 9 exemplarily illustrates an isometric view of an embodiment of the roofing apparatus 100, showing a weir 120 positioned on a front panel 102 of the roofing apparatus 100. The weir 120 is an opening that extends horizontally along the length of the front panel 102 of the roofing apparatus 100. The orifices 108 and 109 release runoff from the frequent, low intensity rainfall from the enclosure 107 to the tail area 112 of the next downslope roofing apparatus 100b or 100c exemplarily illustrated in FIG. 6, while the weir 120 releases runoff from the less frequent, high intensity rainfall from the enclosure 107 of the upslope roofing apparatus 100a or 100b to the tail area 112 of the next downslope roofing apparatus 100b or 100c. The enclosure 107 of the roofing apparatus 100 holds runoff from the high intensity rainfall until the capacity of the roofing materials 401 and 402 exemplarily illustrated in FIGS. 4A-4B, FIGS. 5-6, FIGS. 8A-8B, FIG. 14B, and FIG. 15B, and the capacity of the orifices 108 and 109 to drain the runoff is reached. Additional runoff received by the tail area 112 builds up in the tail area 112, then overtops the rear panel assembly 106, begins to flow over the top of the plantings 401 in the enclosure 107, and continues through the weir 120 at the front panel 102 of the roofing apparatus 100. The runoff flows out of the weir 120 to the tail area 112 of the next downslope roofing apparatus 100b or 100c where the process repeats, or to the eave 301b of the roof 301 and drained into the roof gutter 601 exemplarily illustrated in FIG. 6. The weir 120 provides sufficient capacity to prevent the runoff from overtopping the side panels 103. The side panels 103 provide enough pressure head over the front panel 102 for preventing the runoff from overtopping the side panels 103.

The roofing apparatus 100 is constructed based on design criteria comprising, for example, rainfall intensity, overflow capacity, underflow capacity, through flow capacity, side flow capacity, maintenance requirements, and roof pitch. Overflow capacity refers to capacity of the roofing apparatus 100 to convey the runoff over the top 102b of the roofing apparatus 100 below the height of the side panels 103. Underflow capacity refers to the capacity of the roofing apparatus 100 to convey runoff under the base panel 101. Through flow capacity refers to the capacity of the roofing apparatus 100 to convey the runoff over the base panel 101, excluding the overflow. The overflow capacity and the through flow capacity of the roofing apparatus 100 prevent underflow of the runoff from infrequent, high intensity rainfall. The roofing apparatus 100 ensures that the runoff overtops the top edge 102b of the front panel 102 of the roofing apparatus 100 before the runoff can overtop the up-roof edge 118 of the roofing apparatus 100, thereby preventing any underflow. The roofing apparatus 100 is constructed such that the roofing apparatus 100 and the roofing materials 401 and 402 pass the runoff from the low intensity rainfall through the roofing apparatus 100 in, for example, less than 24 hours. Moreover, the roofing apparatus 100a prevents the runoff from spilling over to adjacent roofing apparatuses 100b exemplarily illustrated in FIG. 4B, thereby aiding to prevent underflow. The roofing apparatus 100 is constructed such that there is minimal dependency on maintenance, for example, cleaning.

Consider an example for constructing a roofing apparatus 100 based on the design criteria for infrequent, high intensity rainfall. A probable maximum rainfall with a safety factor (SF) or significant infrequent rainfall intensity with a safety factor is developed. Since the probable maximum rainfall is not widely available for short duration rainfall intensities, the rainfall intensity is a relatively conservative value based on the probability of a 500-year, 0.2% annual chance, and 5-minute (min) rainfall for a typical temperate location during the expected life of the roof 301. Therefore, for a 500-year, 5-minute rainfall, the rainfall intensity is, for example, about 0.58 inches/5 min. This is equivalent to a rainfall intensity of 0.58 inches×60 min/hour (hr)/5 min, that is, 6.96 inches/hr. Assuming a safety factor of 2.0, which also accounts for variability in location, the rainfall intensity is, for example, 6.96 inches/hr×2.0=13.92 inches/hr. That is, the roofing apparatus 100 is constructed to convey flow from the runoff during a rainfall of intensity≤13.92 inches/hr.

In this example, the rational method using the rational formula is used to estimate peak runoff during the design rainfall with an intensity of about 13.9 inches/hr. The rational formula is $Q = Ci A_w$, where Q is the flow rate of the runoff in cubic feet per second (cfs), C is a dimensionless runoff coefficient, that is, an empirical coefficient representing a relationship between the rainfall and the runoff; where the value of the coefficient lies between 0 and 1, "i" is the rainfall intensity during time of concentration (in/hr), and $A_w$ is the contributing watershed area in acres. The value of "i" depends on the time of concentration. Time of concentration refers to the time needed for the runoff to flow from the ridge 301a of the roof 301 to the eave 301b of the roof 301 exemplarily illustrated in FIG. 6.

In this example, a high coefficient C=1.00 is selected due to the fact that the roofing apparatus 100 is likely to be saturated during the design rainfall of 13.9 inches/hr. The time of concentration is calculated, for example, using Manning's equation. That is, $Q=(1.49/n)(A_s)(R^{2/3})(s^{1/2})$, where Q is the flow rate of the runoff in cubic feet per second (cfs), "n" is a roughness coefficient, $A_s$ is the cross-sectional area of the flow in square feet (ft$^2$), R is the hydraulic radius, that is, the cross-sectional area of the flow ($A_s$) divided by a wetted perimeter of the roofing system 300 in feet (ft), and "s" is the slope of the roof 301 (ft/ft). The wetted perimeter is the perimeter of the cross-section that is wet. In this example, Q=0.011 cfs, n=0.04, width (W)=0.67 ft, depth=0.02 ft, $A_s$=W*depth=0.013 ft$^2$, length=50 ft, and slope=0.50 ft/ft. Therefore velocity (v)=Q/$A_s$=0.9 ft/s. The time of concentration (Tc)=L/V=50 ft/0.9 ft/sec=55 seconds (sec).

In this example, the maximum distance from the ridge 301a of the roof 301 to eave 301b of the roof 301 is 50 feet (ft). Due to the short travel time from the ridge 301a of the roof 301 to the eave 301b of the roof 301, which is less than 5 minutes, the average intensity of rainfall during the travel time of the flow from the ridge 301a of the roof 301 to the eave 301b is equal to the design intensity of 13.9 inches/hr, which is a 5 minute intensity.

In this example, the roof 301 has the following slopes:

| Roof Pitch | Slope |
|---|---|
| 3/12 | 25% |
| 4/12 | 33% |
| 5/12 | 42% |
| 6/12 | 50% |
| 7/12 | 58% |
| 8/12 | 66% |

This corresponds to a design intensity of 13.9 inches/hr. The rainfall intensity is 13.9 inches/hr, $A_w$=(50 ft×0.67 ft)/43,560 ft$^2$/ac=0.00077 ac. Therefore, flow rate of the runoff=Q=1.00×13.9 inches/hr×0.00077 ac=0.011 cfs.

The roofing apparatus 100 is configured to ensure overflow capacity such that the runoff from the high intensity rainfall can pass over the top edge 102b of the front panel 102 of the roofing apparatus 100 without overtopping the up-roof edge 118 of the tail area 112.

Figure 10:
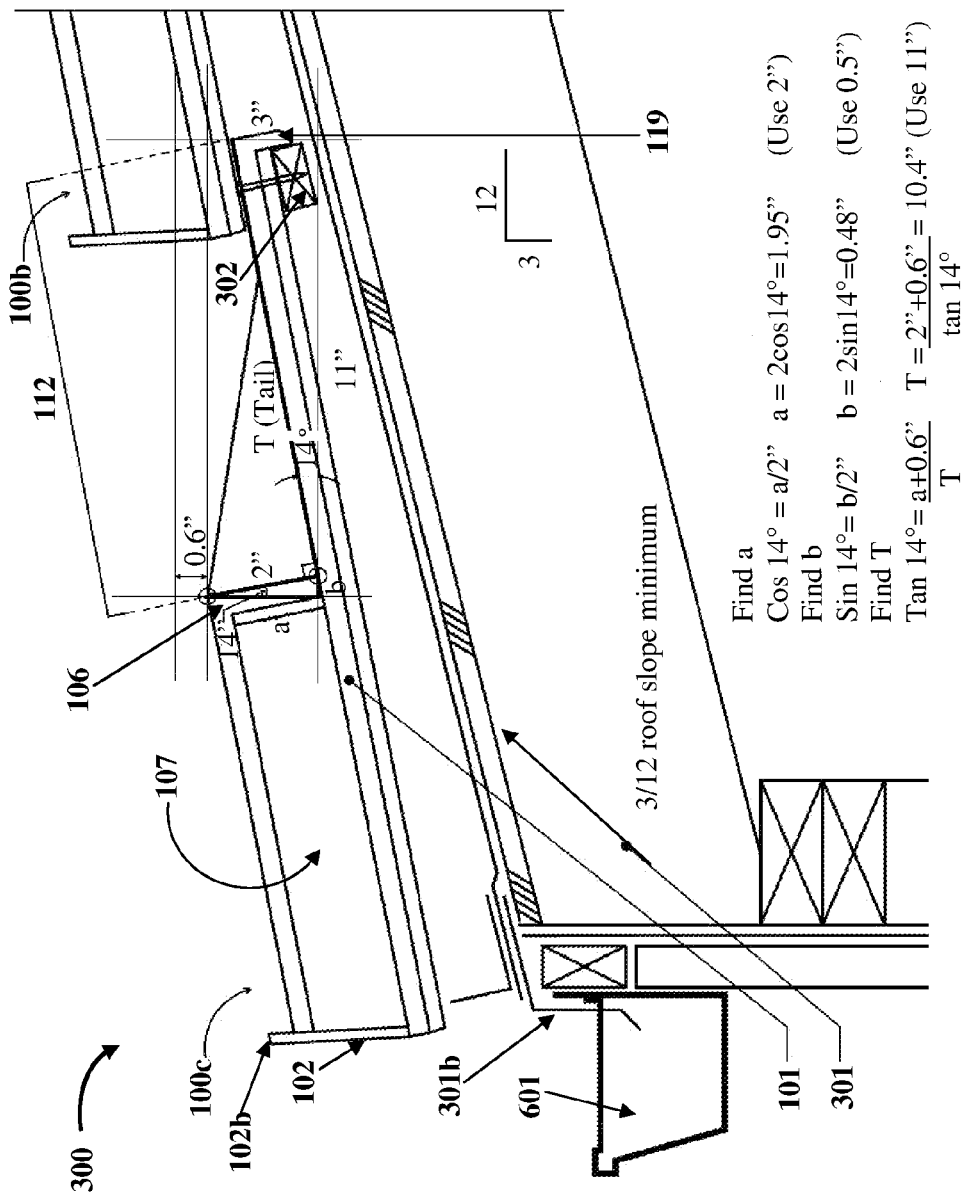
FIG. 10 exemplarily illustrates geometrical calculations for determining the length of a tail area of a base panel of the roofing apparatus.

FIG. 10 exemplarily illustrates geometrical calculations for determining the length of the tail area 112 of the base panel 101 of the roofing apparatus 100c. Roof pitch for each of the roofing apparatuses 100b and 100c rested on the roof 301 is considered. Roof pitch is a numerical measure of the steepness of the roof 301. In this example, the roof pitch is 3/12 and the slope is 25% at the shallowest part of the roof 301. Therefore, the roofing apparatus 100c placed on the shallowest part of the roof 301 has the lowest up-roof edge 118 elevation and requires the longest tail area 112.

The height of water needed above the weir 120 exemplarily illustrated in FIG. 9, of the roofing apparatus 100c is calculated using the equation: $Q=CLH^{3/2}$, where, Q=flow rate (cfs), C=dimensionless weir coefficient, L=length of the weir 120 (ft), and H=height of the water surface over the edge of the weir 120 (ft). The value of C is 3.0 for a sharp crested weir 120.

The overflow capacity for the roofing apparatus 100c in which the top edge 102b of the front panel 102 is flat is determined, for example, by: $H=(Q/CL)^{2/3}$=(0.011 cfs/(3.0× 0.67 ft))$^{2/3}$=0.031 ft=0.37 inches, approximated, for example, to about 0.6 inches. Therefore, the up-roof edge 118 of the roofing apparatus 100c is, for example, at least 0.6 inches above the top edge 102b of the front panel 102 of the roofing apparatus 100c. The length of the tail area 112 (T) is (2.0 inch+0.6 inch)/tan 14°=10.4 inches, approximated, for example, to about 11.0 inches.

In order to provide sufficient drainage for the roofing materials 401 and 402, the front panel 102 of the roofing apparatus 100c comprises orifices 108 and 109 to allow through flow. The size of the orifices 108 and 109 is calculated using an orifice equation. The orifice equation is, $Q=CA_o(2gH)^{1/2}$, where Q=flow rate (cfs), C=dimensionless coefficient, $A_o$=area of the orifice (ft$^2$), g=gravitational acceleration, that is, 32.2 ft/s$^2$, and H is the pressure head at the center of an orifice 108 or 109 (ft).

$$A_o=Q/(C(2gH)^{1/2}),$$

$$A_o=0.011 \text{ cfs}/(0.60(2\times32.2 \text{ ft/s}^2\times0.167 \text{ ft})^{1/2}),$$

$$A_o=0.0043 \text{ ft}^2=0.62 \text{ inch}$$

For all constructions of the roofing apparatus 100c, the area of the orifices 108 and 109 is at least about 0.5 inches to about 2.0 inches$^2$ (SF=1.5).

The roofing apparatuses 100b and 100c prevent side flow in order to prevent the runoff from getting under the roofing apparatuses 100b and 100c on the roof 301. The side flow is blocked by providing high enough side panels 103. The height of the side panels 103 is calculated, for example, using Manning's equation: $Q=(1.49/n)A_s R^{2/3} s^{1/2}$. In this example, Q=0.011 cfs, n=0.04, and $A_s$=0.67. Therefore, Q=(1.49/0.04) (0.67 ft×S)×((0.67 ft×S)/(0.67+2×S))$^{2/3}$×(0.25 ft/ft)$^{1/2}$. Solving for S, where S is height of the side panels 103 above the growth media 402, S=0.016 ft=0.2 inches. That is, the height of the side panels 103 of the roofing apparatuses 100b and 100c on the roof 301 is, for example, 0.5 inches above the growth media 402.

The roofing apparatus 100a, 100b, or 100c disclosed herein, exemplarily illustrated in FIG. 6, is configured to function on a roof 301 with a slope of 3 vertical to 12 horizontal, that is, 3/12 or greater. The connected roofing apparatuses 100a, 100b, and 100c may be positioned on roofs 301, for example, with slopes of 3/12, 4/12, 5/12, 6/12, 7/12, and 8/12. The tail area 112 of the roofing apparatus 100a, 100b, or 100c is longer on gently sloped roofs 301 than on steeply sloped roofs 301 to prevent water from backing up from the up-roof edge 118 of the tail area 112 and flooding the roof 301 underlayment. The length of the tail area 112 is dependent on the elevation of the up-roof edge 118 of the tail area 112, and is therefore greater on a gentler slope. For example, the tail area 112 is approximately 11.2 inches on a roofing apparatus 100a, 100b, or 100c on a roof 301 with a 3/12 slope, and the tail area 112 is approximately 5.4 inches on a roofing apparatus 100a, 100b, or 100c on a roof 301 with a 6/12 slope. As the tail area 112 represents surface area that is not covered by the roofing materials 401 and 402, the roofing apparatus 100a, 100b, or 100c is constructed such that the tail area 112 is less than 50% of the total area of the roofing apparatus 100a, 100b, or 100c, ensuring that more than 50% of the roof 301 is covered by the roofing materials 401 and 402.

Figure 11A:
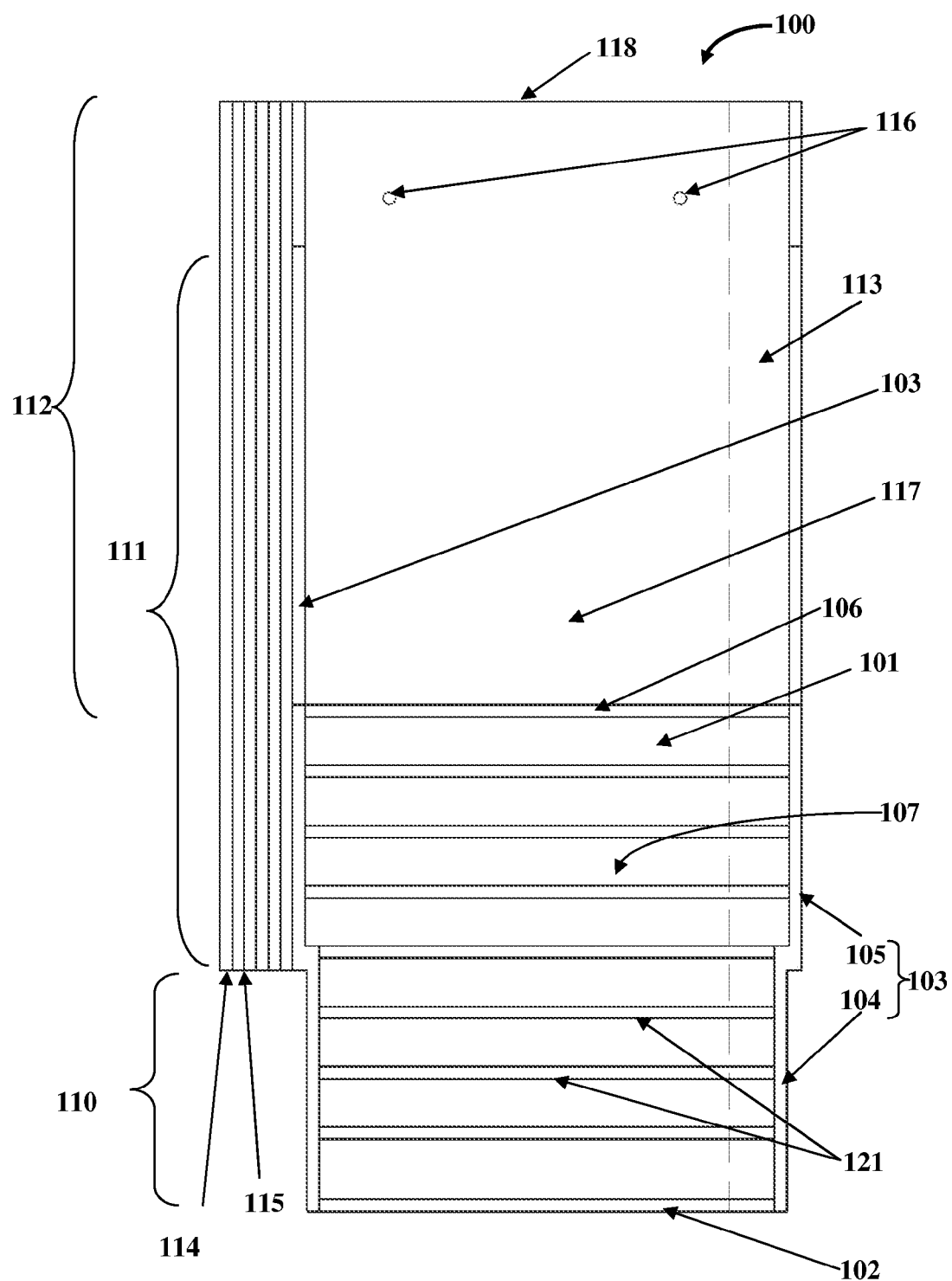
FIG. 11A exemplarily illustrates a plan view of an embodiment of the roofing apparatus, showing anchor ridges positioned within the enclosure of the roofing apparatus.
Figure 11B:
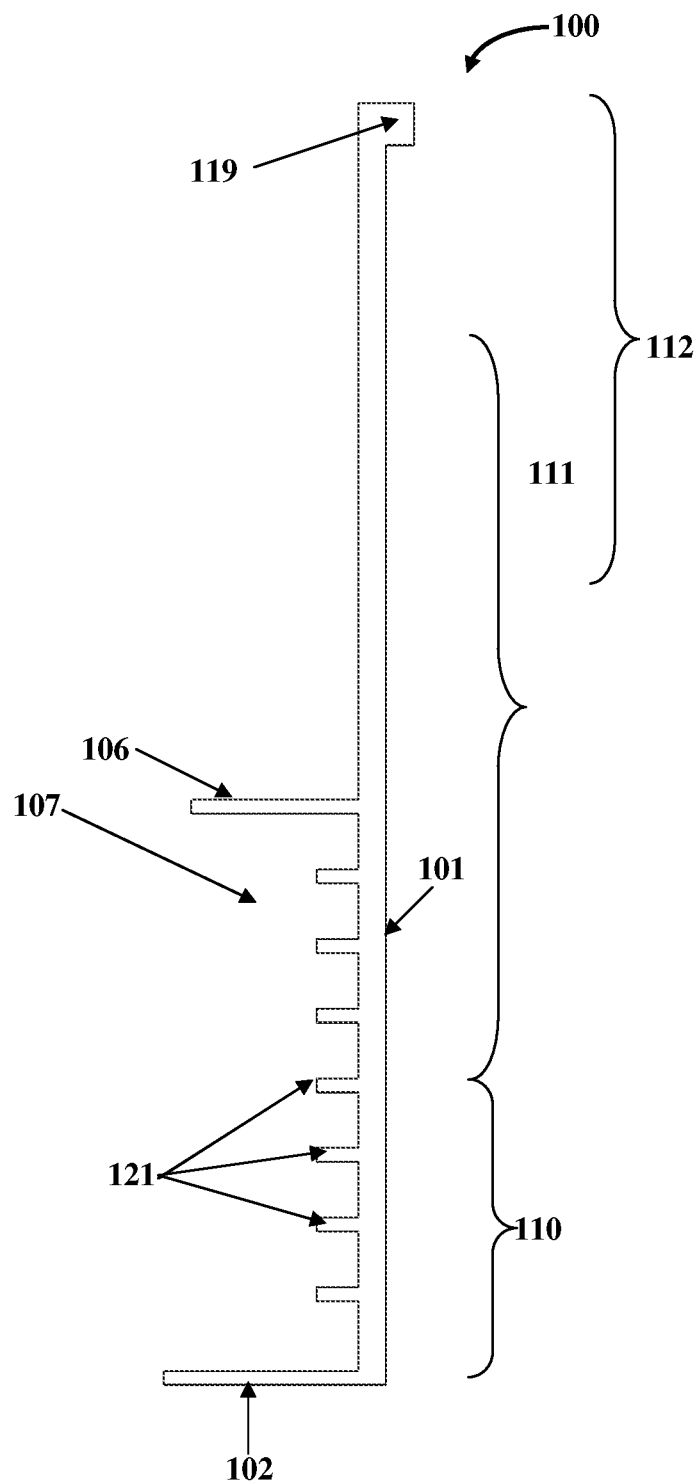
FIG. 11B exemplarily illustrates a side cutaway view of the embodiment of the roofing apparatus, showing anchor ridges positioned within the enclosure of the roofing apparatus.

FIGS. 11A-11B exemplarily illustrate a plan view and a side cutaway view respectively, of an embodiment of the roofing apparatus 100, showing anchor ridges 121 positioned within the enclosure 107 of the roofing apparatus 100. The anchor ridges 121 are positioned at a predefined distance from each other and parallel to the front panel 102 within the enclosure 107. The anchor ridges 121 are, for example, between about 0.25 inches and about 1.0 inch in height. The anchor ridges 121 are configured to preclude slippage of the roofing materials 401 and 402 contained within the enclosure 107 and to preclude uplift of the roofing materials 401 and 402 from the enclosure 107 due to environmental conditions, for example, wind. That is, the anchor ridges 121 provide resistance to slippage of the growth media 402 and also provide resistance to uplift of the growth media 402 due to wind. In an embodiment, the anchor ridges 121 are configured as one or more dams to trap runoff and rain water or irrigation water for use by the plantings 401 contained within the enclosure 107.

Figure 12A:
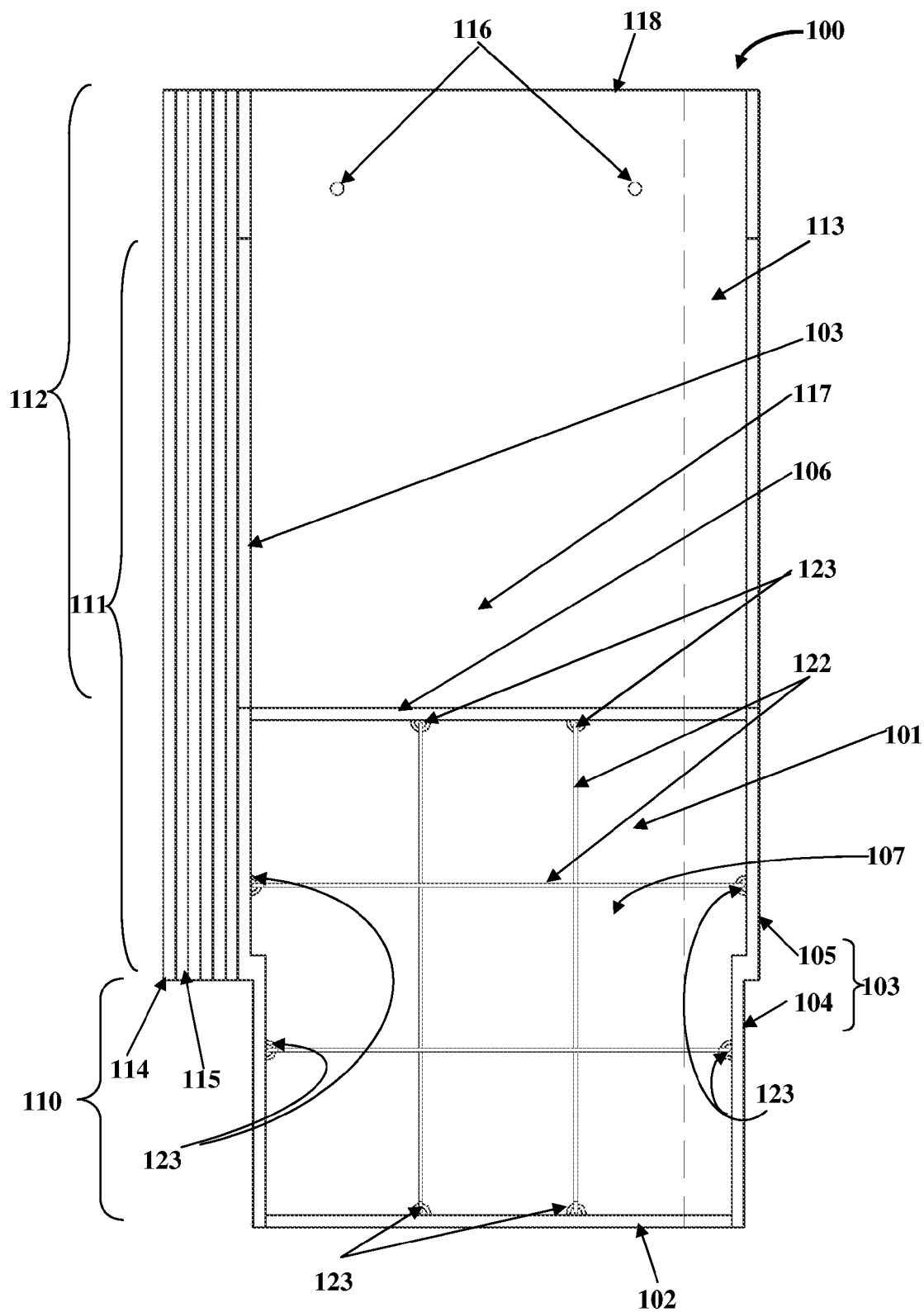
FIG. 12A exemplarily illustrates a plan view of an embodiment of the roofing apparatus, showing elongate fasteners positioned within the enclosure of the roofing apparatus.
Figure 12B:
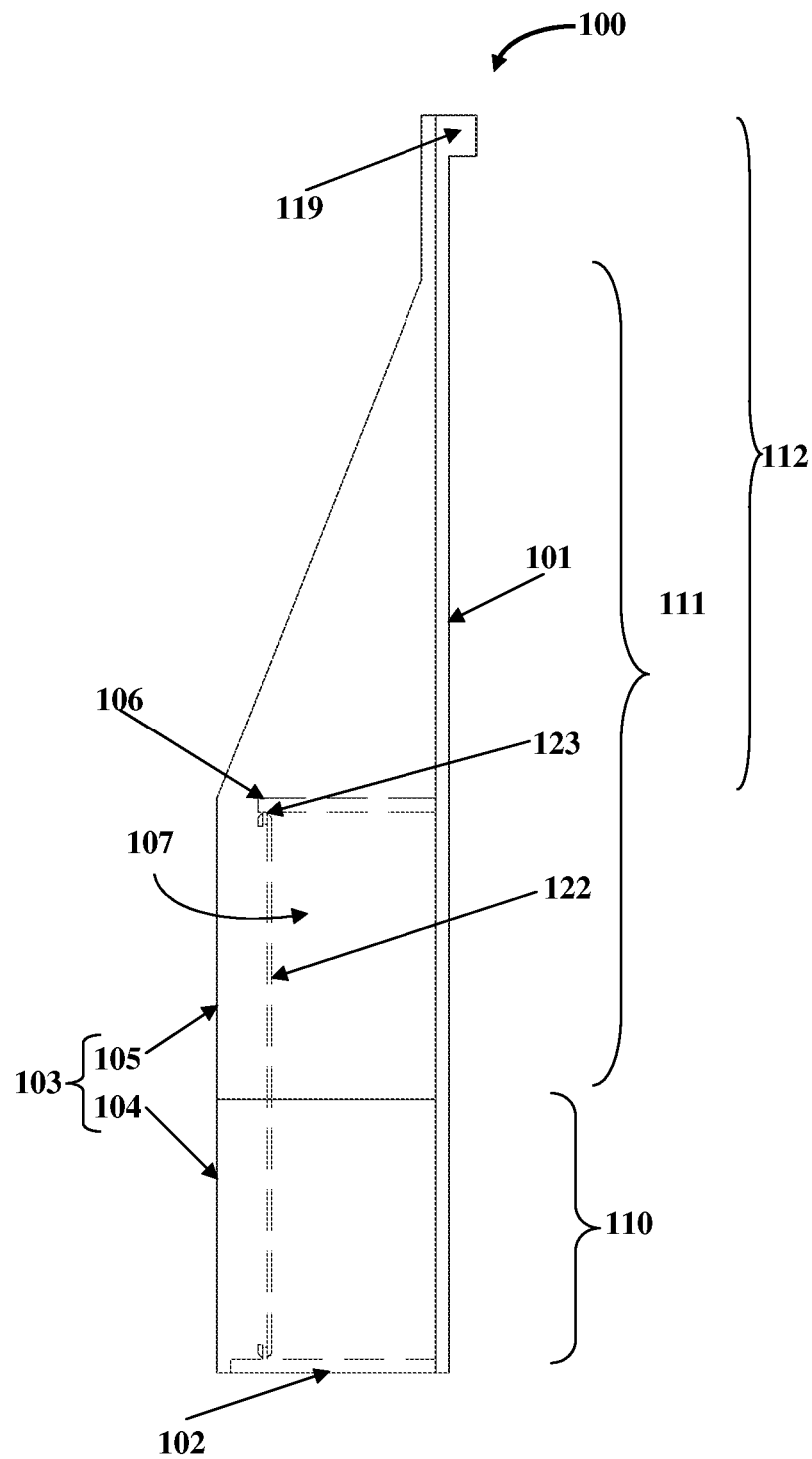
FIG. 12B exemplarily illustrates a side elevation view of the embodiment of the roofing apparatus, showing elongate fasteners positioned within the enclosure of the roofing apparatus.

FIGS. 12A-12B exemplarily illustrate a plan view and a side elevation view of an embodiment of the roofing apparatus 100, showing elongate fasteners 122 positioned within the enclosure 107 of the roofing apparatus 100. The elongate fasteners 122, for example, wire fasteners are connected from the front panel 102 to the rear panel assembly 106, and from one of the side panels 103 to the other of the side panels 103 within the enclosure 107, for example, in a criss cross configuration. The elongate fasteners 122 therefore extend from one of the side panels 103 to the other of the side panels 103, and from the front panel 102 to the rear panel assembly 106 within the enclosure 107. The elongate fasteners 122 are configured to preclude uplift of the roofing materials 401 and 402 from the enclosure 107 due to environmental conditions, for example, wind. The elongate fasteners 122 are anchored to the side panels 103 and to the front panel 102 and the rear panel assembly 106, for example, via eyelets 123 provided on the inner surfaces of the side panels 103, the front panel 102, and the rear panel assembly 106. The elongate fasteners 122 hook into the eyelets 123, which are built-into the enclosure 107, to provide resistance to uplift of the growth media 402 and the plantings 401 due to wind.

Figure 13A:
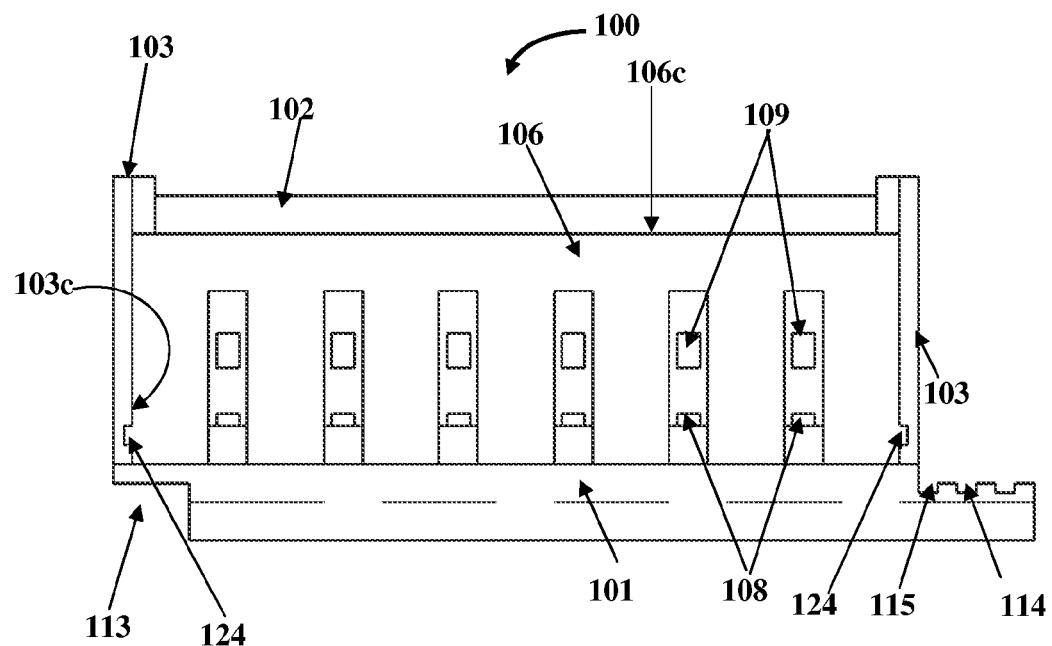
FIGS. 13A-13B exemplarily illustrate elevation views of an embodiment of the roofing apparatus, showing a nesting groove and a nested ridge positioned on an inner surface and an outer surface respectively, of each of the side panels.
Figure 13B:
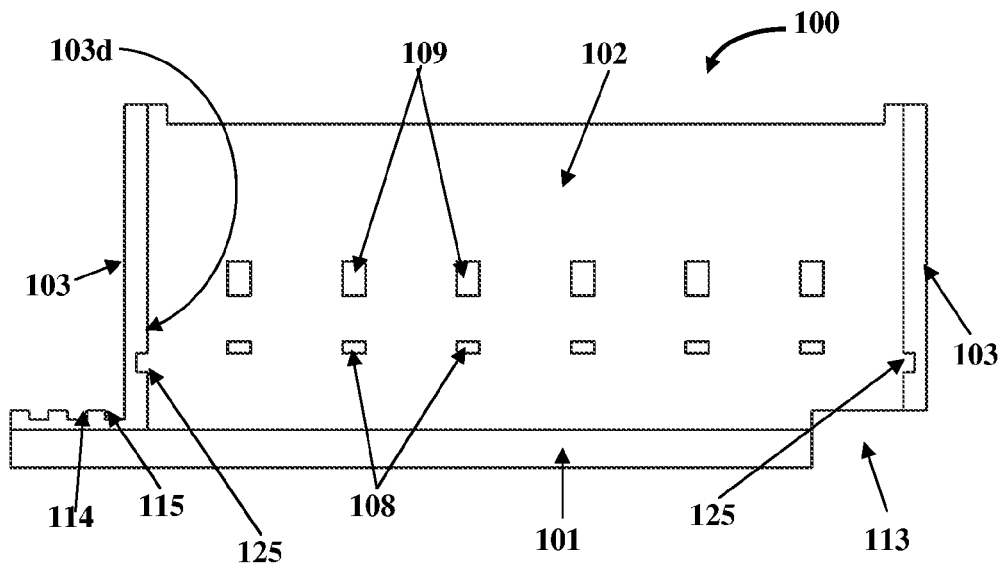

FIGS. 13A-13B exemplarily illustrate elevation views of an embodiment of the roofing apparatus 100, showing a nesting groove 124 and a nested ridge 125 positioned on an inner surface 103c and an outer surface 103d respectively, of each of the side panels 103. The nesting groove 124 is positioned on an inner surface 103c of each of the side panels 103 and extends rearward from the rear panel assembly 106. The nested ridge 125 is positioned on the outer surface 103d of each of the side panels 103. The nested ridge 125 on the outer surface 103d of each of the side panels 103 of an upslope roofing apparatus 100a or 100b, exemplarily illustrated in FIG. 3A and FIG. 3C, is configured to slide into and engage with the nesting groove 124 on the inner surface 103c of each of the side panels 103 of a downslope roofing apparatus 100b or 100c. The engagement of the upslope roofing apparatus 100a or 100b with the downslope roofing apparatus 100b or 100c using a combination of the nested ridge 125 and the nesting groove 124, precludes uplift of the roofing apparatuses 100a, 100b, and 100c due to environmental conditions. The nesting groove 124 extends into the inner surface 103c of each of the side panels 103, for example, about ⅛ of an inch. The nesting grooves 124 are, for example, about ¼ of an inch wide and about 4 inches to about 5 inches long. The nested ridges 125 extend from the outer surface 103d of each of the side panels 103, for example, about ⅛ of an inch. The nested ridges 125 are, for example, about ¼ of an inch wide and about 4 inches to about 5 inches long. The nested ridges 125 of the upslope roofing apparatus 100a or 100b slide into the nesting grooves 124 of the downslope roofing apparatus 100b or 100c in order to provide resistance to uplift of the roofing apparatuses 100a, 100b, and 100c, for example, due to wind.

Figure 14A:
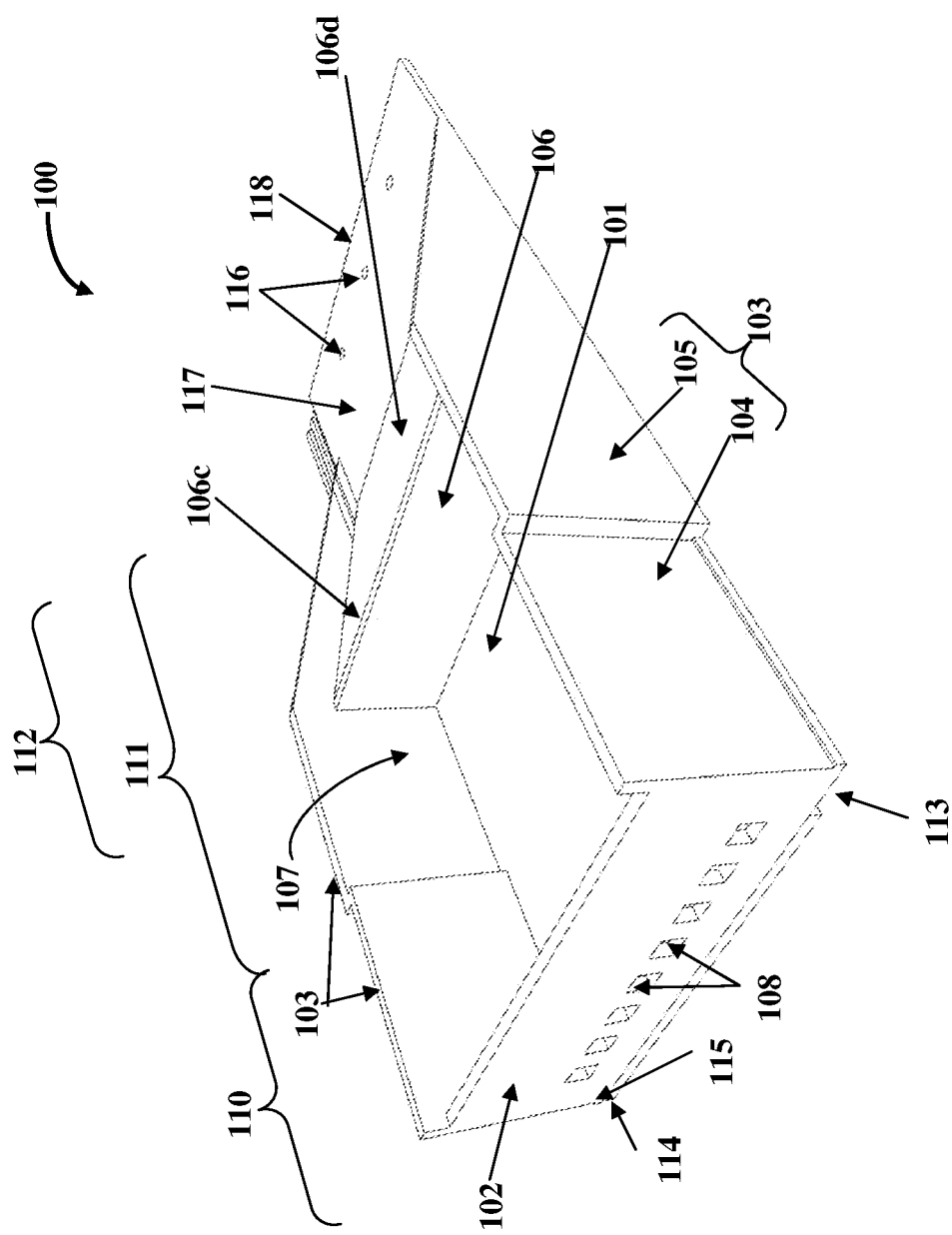
FIG. 14A exemplarily illustrates an isometric view of an embodiment of the roofing apparatus, showing a rear panel assembly comprising a slope member.

FIG. 14A exemplarily illustrates an isometric view of an embodiment of the roofing apparatus 100, showing a rear panel assembly 106 comprising a slope member 106d. In an embodiment, the rear panel assembly 106 comprises a slope member 106d inclined from a top edge 106c of the rear panel assembly 106 towards the tail area 112 of the base panel 101. The slope member 106d is configured to control flow of the received runoff from the tail area 112 of the base panel 101 into the enclosure 107 of the roofing apparatus 100.

Figure 14B:
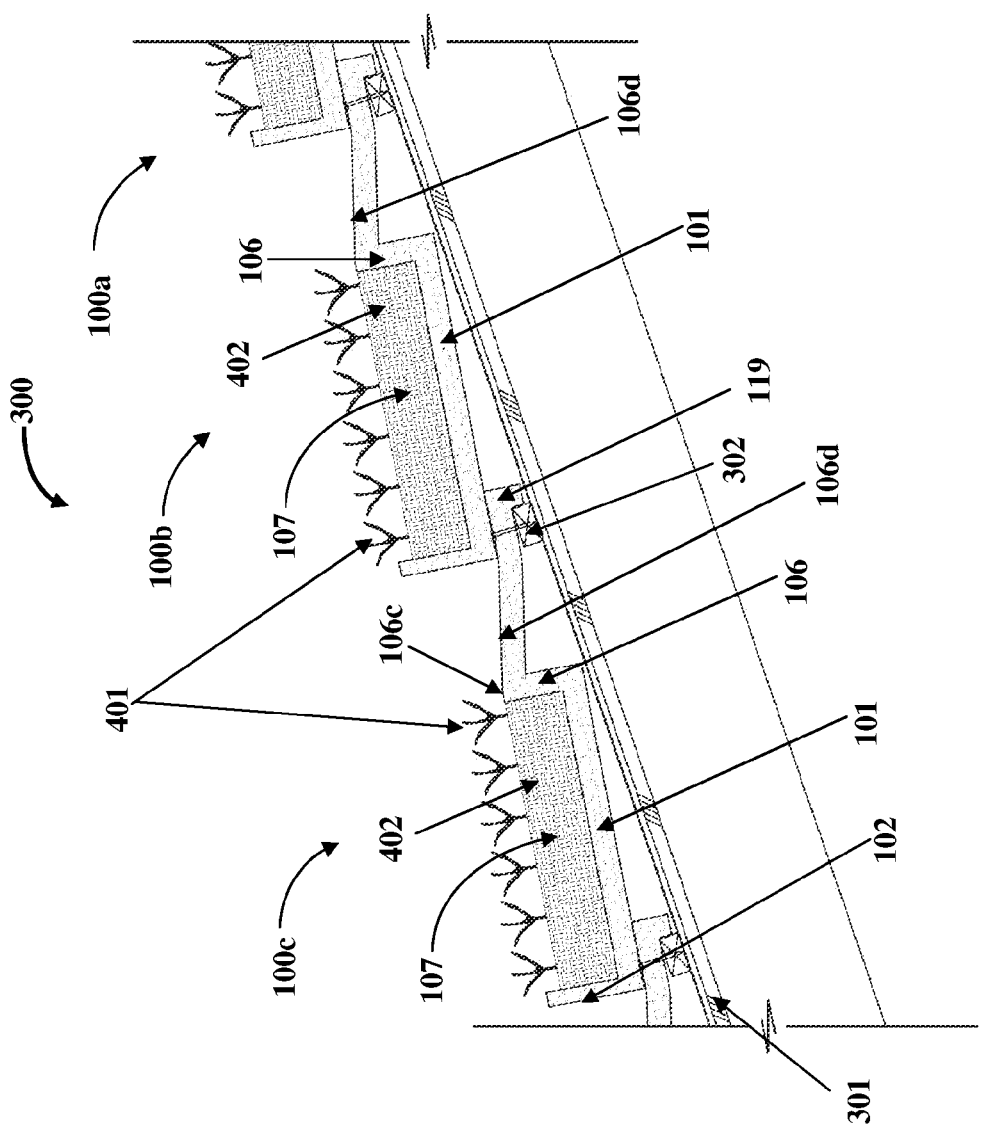
FIG. 14B exemplarily illustrates a partial side sectional view of a roofing system, showing the rear panel assembly comprising the slope member in each of the connected roofing apparatuses of the roofing system.

FIG. 14B exemplarily illustrates a partial side sectional view of a roofing system 300, showing the rear panel assembly 106 comprising the slope member 106d in each of the connected roofing apparatuses 100a, 100b, and 100c of the roofing system 300. Each of the connected roofing apparatuses 100a, 100b, and 100c are positioned on the roof 301 such that the irrigation and rainfall runoff from the upslope roofing apparatus 100a lands on the top edge 106c of the rear panel assembly 106 and flows into the enclosure 107. This embodiment enables the runoff from the upslope roofing apparatus 100a or 100b to directly enter the top of the enclosure 107 of the downslope roofing apparatus 100b or 100c, rather than through the bottom of the enclosure 107 of the downslope roofing apparatus 100b or 100c. This embodiment aids irrigation of the plantings 401 contained within the enclosure 107. The up-roof edge 118 of the upslope roofing apparatus 100a or 100b must be positioned higher than the downslope edge 106c in order to prevent spillage upslope of the upslope roofing apparatus 100a or 100b. The slope member 106d also directs less frequent high intensity rainfall over, instead of through the enclosure 107. The slope member 106d is configured to facilitate functions, for example, reducing the weight of water stored in the pooling area 117 exemplarily illustrated in FIG. 14A, increasing the water shedding function of the roofing system 300, etc.

Figure 15A:
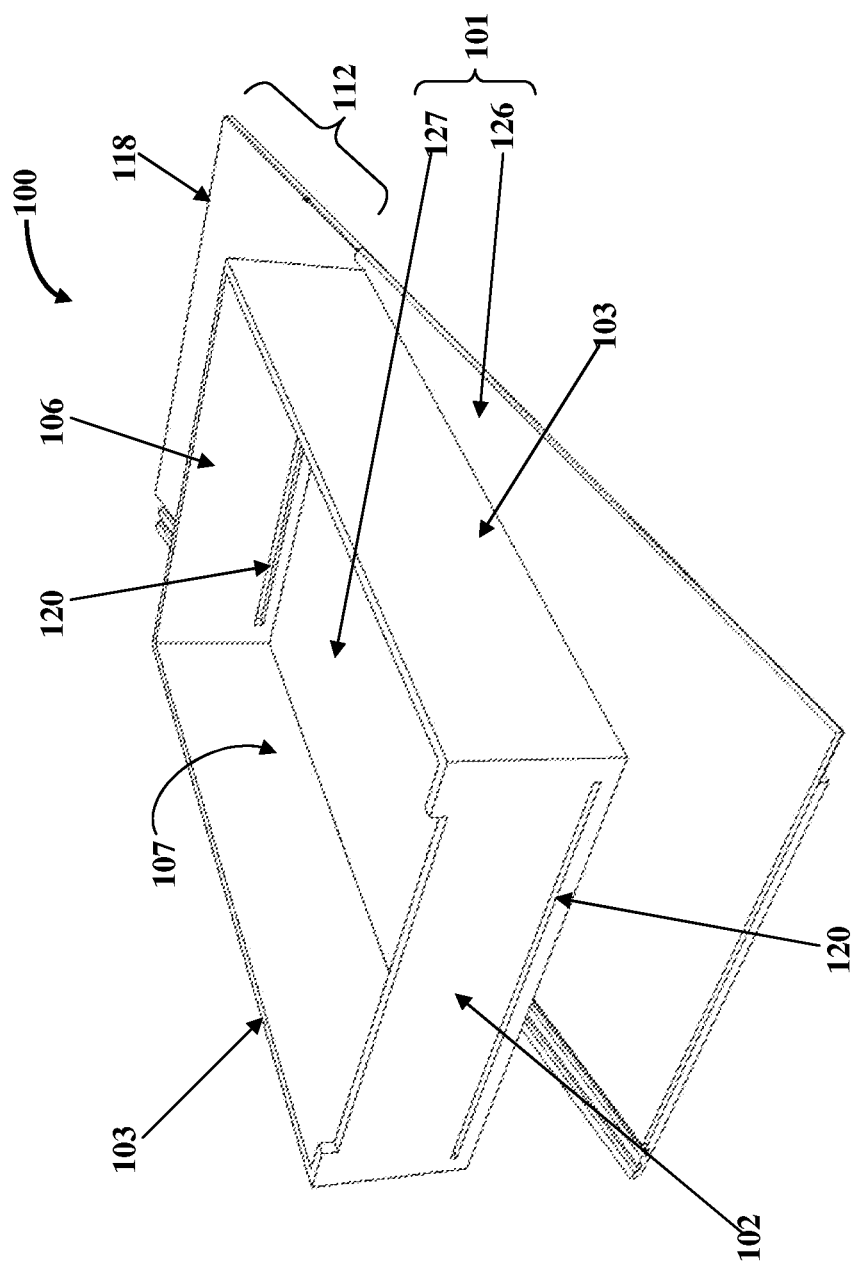
FIG. 15A exemplarily illustrates an isometric view of an embodiment of the roofing apparatus, showing the base panel configured as an assembly.

FIG. 15A exemplarily illustrates an isometric view of an embodiment of the roofing apparatus 100, showing the base panel 101 configured as an assembly. In this embodiment, the base panel 101 is configured as an assembly comprising a first base section 126 having the tail area 112, and a second base section 127 inclined from the first base section 126. In this embodiment, the front panel 102, the rear panel assembly 106, and the side panels 103 extend upwardly from the second base section 127 to define the enclosure 107.

Furthermore, as exemplarily illustrated in FIG. 15A, a weir 120 is positioned on the front panel 102 and on the rear panel assembly 106 of the roofing apparatus 100. The weirs 120 extend horizontally along the length of the front panel 102 and the rear panel assembly 106 of the roofing apparatus 100. The weirs 120 release runoff from the less frequent, high intensity rainfall from the enclosure 107 of an upslope roofing apparatus 100b to the tail area 112 of a downslope roofing apparatus 100c, and from the tail area 112 to the enclosure 107 of the downslope roofing apparatus 100c.

Figure 15B:
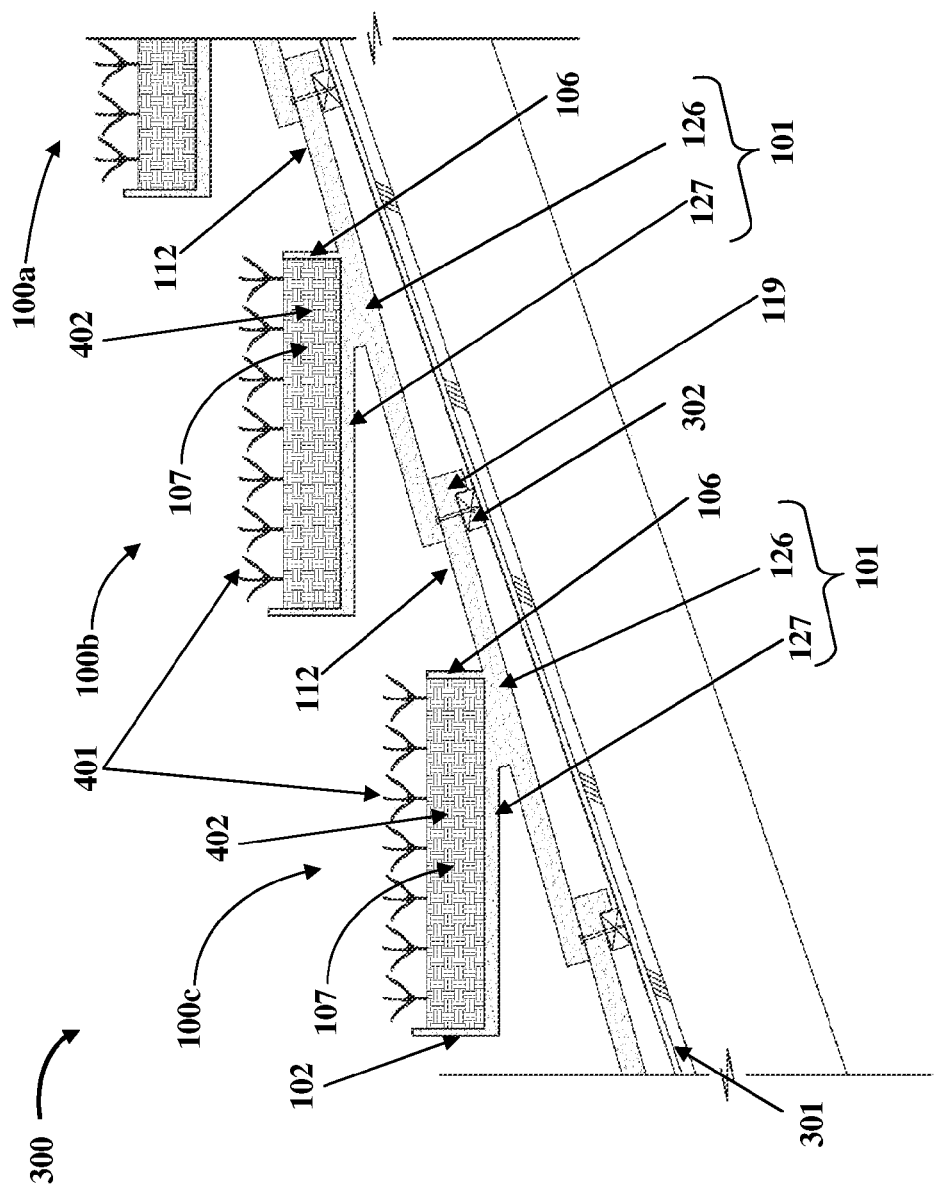
FIG. 15B exemplarily illustrates a partial side sectional view of a roofing system, showing the base panel configured as an assembly in each of the connected roofing apparatuses of the roofing system.

FIG. 15B exemplarily illustrates a partial side sectional view of a roofing system 300, showing the base panel 101 configured as an assembly in each of the connected roofing apparatuses 100a, 100b, and 100c of the roofing system 300. The roofing apparatuses 100a, 100b, and 100c are positioned on the roof 301 such that the second base section 127 of each of the roofing apparatuses 100a, 100b, and 100c is positioned in a horizontal orientation with respect to the roof 301, while the first base section 126 is positioned parallel to a sloped roof 301. This embodiment provides additional capacity for the growth media 402 and additional coverage of area of the roof 301 because this embodiment allows for overlapping of the enclosure 107 of the upslope roofing apparatus 100a or 100b over the enclosure 107 of the downslope roofing apparatus 100b or 100c. Rain water is efficiently contained in each of the roofing apparatuses 100a, 100b, and 100c to allow growth of the plantings 401 contained in their respective enclosures 107.

Figure 16:
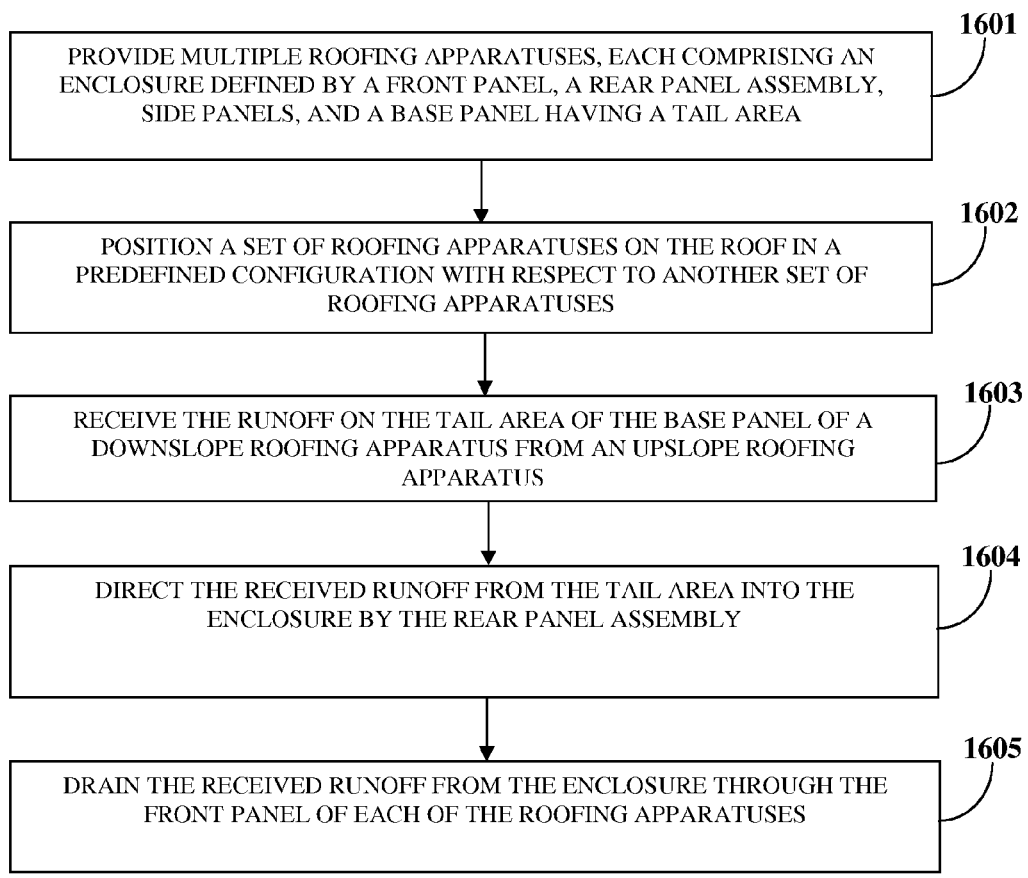
FIG. 16 exemplarily illustrates a method for roofing and managing precipitation and runoff on a roof.

FIG. 16 exemplarily illustrates a method for roofing and managing precipitation and runoff on a roof 301. The method disclosed herein provides 1601 multiple roofing apparatuses 100a, 100b, and 100c, where each of the roofing apparatuses 100a, 100b, and 100c comprises an enclosure 107 configured to contain roofing materials 401 and 402 and defined by a front panel 102, a rear panel assembly 106, side panels 103, and a base panel 101 having a tail area 112 as disclosed in the detailed description of FIGS. 1A-15B. A set of roofing apparatuses 100a, 100b, and 100c are positioned 1602 on the roof 301 in a predefined configuration with respect to another set of the roofing apparatuses 100a, 100b, and 100c. The predefined configuration for positioning the roofing apparatuses 100a, 100b, and 100c on the roof 301 is, for example, an upslope configuration, a downslope configuration, and an adjacent configuration as exemplarily illustrated in FIGS. 3A-3C, a row configuration and a column configuration as exemplarily illustrated in FIG. 8A, any geometrical configuration as exemplarily illustrated in FIG. 8B, etc. Furthermore, the nesting area 111 of a downslope roofing apparatus 100b is configured to support the nested area 110 of an upslope roofing apparatus 100a as disclosed in the detailed description of FIGS. 1A-1C. In an embodiment, a set of roofing apparatuses 100a, 100b, and 100c is positioned in an adjacent configuration with respect to another set of roofing apparatuses 100a, 100b, and 100c by engaging a side notch 113 extending along a length of one of the side panels 103 of each of the roofing apparatuses 100a, 100b, and 100c with a side key 114 extending outwardly along a length of another one of the side panels 103 of each of the other roofing apparatuses 100a, 100b, and 100c as exemplarily illustrated in FIG. 4B.

Downslope roofing apparatuses 100b and 100c receive 1603 runoff from an upslope roofing apparatus 100a in their respective tail areas 112 as exemplarily illustrated in FIGS. 5-6. The rear panel assembly 106 of each of the downslope roofing apparatuses 100b and 100c directs 1604 the received runoff from their respective tail areas 112 into their respective enclosures 107. The received runoff is then drained 1605 from the enclosures 107, for example, through the orifices 108 and 109 and the weirs 120, exemplarily illustrated in FIG. 9, etc., positioned on the front panel 102 of each of the downslope roofing apparatuses 100c.

In an embodiment, the top edge 102b of the front panel 102 of each of the roofing apparatuses 100a, 100b, and 100c drains excess runoff from their respective enclosures 107. The pooling areas 117 of the roofing apparatuses 100a, 100b, and 100c temporarily hold the received runoff from flowing into their respective enclosures 107. The key notch 115 of each of the roofing apparatuses 100a, 100b, and 100c facilitate flow of runoff along an interface defined between connected roofing apparatuses 100a, 100b, and 100c as exemplarily illustrated in FIG. 3B, and between adjacent roofing apparatuses 100a and 100b as exemplarily illustrated in FIG. 4B. The anchor ridges 121 exemplarily illustrated in FIGS. 11A-11B, and the elongate fasteners 122 exemplarily illustrated in FIGS. 12A-12B preclude slippage of the roofing materials 401 and 402 contained within the enclosure 107 and preclude uplift of the roofing materials 401 and 402 from the enclosure 107 due to environmental conditions, for example, wind. Furthermore, in an embodiment, engagement of an upslope roofing apparatus 100a or 100b with the downslope roofing apparatus 100b or 100c using a combination of the nested ridge 125 and the nesting groove 124, precludes uplift of the roofing apparatuses 100a, 100b, and 100c due to environmental conditions as disclosed in the detailed description of FIGS. 13A-13B.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

I claim:

1. A roofing apparatus comprising:
an enclosure configured to contain roofing materials, said enclosure defined by a front panel, a rear panel assembly, side panels, and a base panel having a tail area, wherein said front panel, said rear panel assembly, and said side panels extend upwardly from said base panel;
said front panel positioned along a length of said base panel;
said side panels positioned at opposing ends of said front panel, wherein each of said side panels extends taperedly to said tail area of said base panel;
said tail area of said base panel extending beyond said rear panel assembly, said tail area of a first said roofing apparatus configured to receive runoff from a second said roofing apparatus connected upslope from said first said roofing apparatus on a roof; and
said rear panel assembly positioned parallel and opposite to said front assembly of said first said roofing apparatus configured to direct said received runoff from said tail area of said base panel of said first said roofing apparatus into said enclosure of said first said roofing apparatus.

2. The roofing apparatus of claim 1, wherein each of said side panels comprises:
a first side section defining a nested area with said front panel and said base panel; and
a second side section outwardly offset from said first side section, wherein said second side section in conjunction with said tail area of said base panel defines a nesting area, wherein said nesting area of said first said roofing apparatus is configured to support said nested area of said second said roofing apparatus connected upslope from said first said roofing apparatus.

3. The roofing apparatus of claim 2, wherein said first side section of said each of said side panels is proximal to said front panel, and wherein said second side section of said each of said side panels is proximal to said rear panel assembly.

4. The roofing apparatus of claim 1, wherein said rear panel assembly comprises a plurality of rear segments separated by a predetermined distance from each other, wherein said rear segments define slots therebetween configured to direct said received runoff from said tail area of said base panel of said first said roofing apparatus into said enclosure of said first said roofing apparatus through said slots.

5. The roofing apparatus of claim 1, wherein said rear panel assembly comprises a slope member inclined from a top edge of said rear panel assembly towards said tail area of said base panel, wherein said slope member is configured to control flow of said received runoff from said tail area of said base panel of said first said roofing apparatus into said enclosure of said first said roofing apparatus.

6. The roofing apparatus of claim 1, further comprising a plurality of orifices positioned on said front panel, wherein said orifices are configured to one of release said received runoff from said second said roofing apparatus to said first said roofing apparatus connected downslope from said second said roofing apparatus, and drain said received runoff from said roof.

7. The roofing apparatus of claim 6, wherein said orifices positioned on said front panel comprise:
   a plurality of low flow orifices positioned proximal to a bottom edge of said front panel; and
   a plurality of high flow orifices positioned above said low flow orifices and proximal to a top edge of said front panel, wherein said high flow orifices are configured to one of release said received runoff from said second said roofing apparatus to said first said roofing apparatus connected downslope from said second said roofing apparatus, and drain said received runoff from said roof.

8. The roofing apparatus of claim 1, further comprising a weir positioned on said front panel, wherein said weir extends horizontally along a length of said front panel, and wherein said weir is configured to release said runoff received from less frequent, high intensity rainfall from said enclosure of said second said roofing apparatus to said tail area of said first said roofing apparatus.

9. The roofing apparatus of claim 1, wherein a top edge of said front panel is defined at a predetermined distance below a top edge of each of said side panels, wherein said top edge of said front panel is configured to drain excess said runoff from said enclosure.

10. The roofing apparatus of claim 1, further comprising a pooling area defined in said tail area proximal to said rear panel assembly, wherein said pooling area is configured to temporarily hold said received runoff from flowing into said enclosure.

11. The roofing apparatus of claim 1, further comprising a side notch extending along a length of one of said side panels, and a side key extending outwardly along a length of another one of said side panels, wherein said side notch of said roofing apparatus is configured to engage with said side key of an adjacent said roofing apparatus.

12. The roofing apparatus of claim 1, further comprising a key notch extending outwardly along a length of one of said side panels, wherein said key notch is configured to facilitate flow of said runoff along an interface defined between adjacent roofing apparatuses.

13. The roofing apparatus of claim 1, further comprising a plurality of anchor ridges positioned at a predetermined distance from each other and parallel to said front panel within said enclosure, wherein said anchor ridges are configured to preclude slippage of said roofing materials contained within said enclosure and uplift of said roofing materials from said enclosure due to environmental conditions.

14. The roofing apparatus of claim 13, wherein said anchor ridges are configured to form one or more dams to trap said runoff for use by said roofing materials contained within said enclosure.

15. The roofing apparatus of claim 1, further comprising one or more elongate fasteners connected from said front panel to said rear panel assembly and from one of said side panels to another of said side panels within said enclosure, wherein said elongate fasteners are configured to preclude uplift of said roofing materials from said enclosure due to environmental conditions.

16. The roofing apparatus of claim 1, further comprising:
   a nesting groove positioned on an inner surface of each of said side panels and extending rearward from said rear panel assembly; and
   a nested ridge positioned on an outer surface of said each of said side panels, wherein said nested ridge on said outer surface of said each of said side panels of said second said roofing apparatus is configured to slide into and engage with said nesting groove on said inner surface of said each of said side panels of said first said roofing apparatus, wherein said engagement between said first said roofing apparatus and said second said roofing apparatus precludes uplift of said first said roofing apparatus and said second said roofing apparatus due to environmental conditions.

17. The roofing apparatus of claim 1, wherein said base panel is configured as an assembly comprising a first base section having said tail area, and a second base section inclined from said first base section, wherein said front panel, said rear panel assembly, and said side panels extend upwardly from said second base section to define said enclosure.

18. The roofing apparatus of claim 1, further comprising a batten anchor positioned on an underside surface of said base panel, wherein said batten anchor is configured to interface said roofing apparatus with a roofing batten on said roof.

19. The roofing apparatus of claim 1, further comprising pre-drilled nail holes in said base panel, wherein said pre-drilled nail holes are configured to allow a fastener to attach said roofing apparatus to a roofing batten on said roof.

20. A method for roofing and managing precipitation and runoff on a roof, comprising:
   providing a plurality of roofing apparatuses, each of said roofing apparatuses comprising:
   an enclosure configured to contain roofing materials, said enclosure defined by a front panel, a rear panel assembly, side panels, and a base panel having a tail area, wherein said front panel, said rear panel assembly, and said side panels extend upwardly from said base panel;
   said front panel positioned along a length of said base panel;
   said side panels positioned at opposing ends of said front panel;
   said tail area of said base panel extending beyond said rear panel assembly; and
   said rear panel assembly positioned parallel and opposite to said front panel at a predetermined distance from said front panel;
   positioning a set of said roofing apparatuses on said roof in a predefined configuration with respect to another set of said roofing apparatuses;
   receiving said runoff on said tail area of said base panel of a first of said roofing apparatuses from a second of said roofing apparatuses connected upslope from said first of said roofing apparatuses on said roof;
   directing said received runoff from said tail area of said base panel of said first of said roofing apparatuses into said enclosure of said first of said roofing apparatuses by said rear panel assembly of said first of said roofing apparatuses;
   draining said received runoff from said enclosure through said front panel of said first of said roofing apparatuses; and draining excess said received runoff from said enclosure by a top edge of said front panel defined at a predetermined distance below a top edge of each of said side panels.

21. The method of claim 20, wherein said predefined configuration for positioning said roofing apparatuses on said roof is one of an upslope configuration, a downslope configuration, an adjacent configuration, a row configuration, a column configuration, and any geometrical configuration.

22. The method of claim 20, wherein each of said side panels comprises:
a first side section defining a nested area with said front panel and said base panel; and
a second side section outwardly offset from said first side section, wherein said second side section in conjunction with said tail area of said base panel defines a nesting area, wherein said nesting area of said first of said roofing apparatuses is configured to support said nested area of said second of said roofing apparatuses connected upslope from said first of said roofing apparatuses.

23. The method of claim 20, wherein said rear panel assembly comprises a plurality of rear segments separated by a predetermined distance from each other, wherein said rear segments define slots therebetween configured to direct said received runoff from said tail area of said base panel of said first of said roofing apparatuses into said enclosure of said first of said roofing apparatuses through said slots.

24. The method of claim 20, wherein each of one or more of said roofing apparatuses further comprises a plurality of orifices positioned on said front panel, wherein said orifices are configured to one of release said received runoff from said second of said roofing apparatuses to said first of said roofing apparatuses connected downslope from said second of said roofing apparatuses, and drain said received runoff from said roof.

25. The method of claim 20, wherein said set of said roofing apparatuses is positioned in an adjacent configuration with respect to said another set of said roofing apparatuses by engaging a side notch extending along a length of one of said side panels of each of said set of said roofing apparatuses with a side key extending outwardly along a length of another one of said side panels of each of said another set of said roofing apparatuses.

26. The method of claim 20, further comprising temporarily holding said received runoff from flowing into said enclosure by a pooling area defined in said tail area proximal to said rear panel assembly of said roofing apparatus.

27. The method of claim 20, further comprising facilitating flow of said runoff along an interface defined between adjacent said roofing apparatuses by a key notch extending outwardly along a length of one of said side panels of each of said adjacent said roofing apparatuses.

28. The method of claim 20, further comprising precluding one or more of slippage of said roofing materials contained within said enclosure and uplift of said roofing materials from said enclosure due to environmental conditions, by one or more of:
a plurality of anchor ridges positioned at a predetermined distance from each other and parallel to said front panel within said enclosure; and
one or more elongate fasteners connected from said front panel to said rear panel assembly and from one of said side panels to another of said side panels within said enclosure.

29. A roofing apparatus comprising:
an enclosure configured to contain roofing materials, said enclosure defined by a front panel, a rear panel assembly, side panels, and a base panel having a tail area, wherein said front panel, said rear panel assembly, and said side panels extend upwardly from said base panel;
said front panel positioned along a length of said base panel;
said side panels positioned at opposing ends of said front panel;
said tail area of said base panel extending beyond said rear panel assembly, said tail area of a first said roofing apparatus configured to receive runoff from a second said roofing apparatus connected upslope from said first said roofing apparatus on a roof;
said rear panel assembly positioned parallel and opposite to said front panel at a predetermined distance from said front panel, said rear panel assembly of said first said roofing apparatus configured to direct said received runoff from said tail area of said base panel of said first said roofing apparatus into said enclosure of said first said roofing apparatus; and
wherein a top edge of said front panel is defined at a predetermined distance below a top edge of each of said side panels, wherein said top edge of said front panel is configured to drain excess said runoff from said enclosure.

* * * * *